United States Patent
Zewail et al.

(10) Patent No.: US 11,716,741 B2
(45) Date of Patent: Aug. 1, 2023

(54) DYNAMIC SWITCHING BETWEEN TB REPETITIONS AND MULTIPLE TBS VIA DCI

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/384,659

(22) Filed: Jul. 23, 2021

(65) Prior Publication Data

US 2023/0035459 A1    Feb. 2, 2023

(51) Int. Cl.
| | | |
|---|---|---|
| *H04W 4/00* | (2018.01) | |
| *H04W 72/23* | (2023.01) | |
| *H04W 80/02* | (2009.01) | |
| *H04W 72/0446* | (2023.01) | |

(52) U.S. Cl.
CPC ....... *H04W 72/23* (2023.01); *H04W 72/0446* (2013.01); *H04W 80/02* (2013.01)

(58) Field of Classification Search
CPC .. H04W 72/23; H04W 72/0446; H04W 80/02
See application file for complete search history.

(56) References Cited

U.S. PATENT DOCUMENTS

| | | | | |
|---|---|---|---|---|
| 11,025,456 | B2* | 6/2021 | Chatterjee | H04W 72/1273 |
| 2019/0149365 | A1* | 5/2019 | Chatterjee | H04L 25/0226 |
| | | | | 370/329 |
| 2020/0351934 | A1* | 11/2020 | Khoshnevisan | H04W 72/23 |
| 2021/0144743 | A1* | 5/2021 | Rastegardoost | H04W 72/23 |
| 2021/0160917 | A1* | 5/2021 | Goto | H04W 72/23 |
| 2021/0307044 | A1* | 9/2021 | Bae | H04W 72/1273 |
| 2021/0360660 | A1* | 11/2021 | Cozzo | H04W 72/0453 |
| 2022/0167352 | A1* | 5/2022 | Bhamri | H04L 5/0053 |
| 2022/0174667 | A1* | 6/2022 | Lei | H04W 72/23 |
| 2022/0224438 | A1* | 7/2022 | Park | H04W 72/0446 |
| 2022/0248480 | A1* | 8/2022 | Elshafie | H04W 92/18 |
| 2022/0322341 | A1* | 10/2022 | Tiirola | H04L 1/1614 |
| 2022/0346134 | A1* | 10/2022 | Wong | H04W 72/23 |

(Continued)

*Primary Examiner* — Abdelnabi O Musa
(74) *Attorney, Agent, or Firm* — Procopio, Cory Hargreaves & Savitch

(57) ABSTRACT

The present disclosure relates to methods and devices for wireless communication including an apparatus, e.g., a UE and/or a base station. The apparatus may receive an indication of at least one TDRA table for one of a plurality of TB modes for communication with the base station, the plurality of TB modes including at least one of a first TB mode or a second TB mode, the first TB mode corresponding to multiple TBs via a single grant, the second TB mode corresponding to a single TB with at least one repetition via the single grant. The apparatus may also apply, based on the at least one TDRA table, the one of the plurality of TB modes for the communication with the base station. Additionally, the apparatus may transmit uplink data, or receive downlink data, based on the one of the plurality of TB modes.

30 Claims, 15 Drawing Sheets

(56) References Cited

U.S. PATENT DOCUMENTS

| | | | |
|---|---|---|---|
| 2022/0361220 A1* | 11/2022 | Zewail | H04W 72/23 |
| 2023/0007651 A1* | 1/2023 | Shi | H04W 72/0446 |
| 2023/0035459 A1* | 2/2023 | Zewail | H04W 72/23 |

* cited by examiner

TDRA Table 410

| Row index | PUSCH mapping type | $K_2$ | S | L |
|---|---|---|---|---|
| 1 | Type A | $j$ | 0 | 14 |
| 2 | Type A | $j$ | 0 | 12 |
| 3 | Type A | $j$ | 0 | 10 |
| 4 | Type B | $j$ | 2 | 10 |
| 5 | Type B | $j$ | 4 | 10 |
| 6 | Type B | $j$ | 4 | 8 |
| 7 | Type B | $j$ | 4 | 6 |
| 8 | Type A | $j+1$ | 0 | 14 |
| 9 | Type A | $j+1$ | 0 | 12 |
| 10 | Type A | $j+1$ | 0 | 10 |
| 11 | Type A | $j+2$ | 0 | 14 |
| 12 | Type A | $j+2$ | 0 | 12 |
| 13 | Type A | $j+2$ | 0 | 10 |
| 14 | Type B | $j$ | 8 | 6 |
| 15 | Type A | $j+3$ | 0 | 14 |
| 16 | Type A | $j+3$ | 0 | 10 |

TDRA Table 510

| Row index | dmrs-TypeA-Position | PUSCH mapping type | $K_0$ | $S$ | $L$ |
|---|---|---|---|---|---|
| 1 | 2 | Type A | 0 | 2 | 12 |
| 2 | 3 | Type A | 0 | 3 | 11 |
| 3 | 2 | Type A | 0 | 2 | 10 |
| 4 | 3 | Type A | 0 | 3 | 9 |
| 5 | 2 | Type A | 0 | 2 | 9 |
| 6 | 3 | Type A | 0 | 3 | 8 |
| 7 | 2 | Type A | 0 | 2 | 7 |
| 8 | 3 | Type A | 0 | 3 | 6 |
| 9 | 2 | Type A | 0 | 2 | 5 |
| 10 | 3 | Type A | 0 | 3 | 4 |
| 11 | 2 | Type B | 0 | 9 | 4 |
| 12 | 3 | Type B | 0 | 10 | 4 |
| 13 | 2 | Type B | 0 | 4 | 4 |
| 14 | 3 | Type B | 0 | 6 | 4 |
| 15 | 2 | Type B | 0 | 5 | 7 |
| 16 | 3 | Type B | 0 | 5 | 2 |
| 17 | 2,3 | Type B | 0 | 9 | 2 |
| 18 | 2,3 | Type B | 0 | 12 | 2 |
| 19 | 2,3 | Type A | 0 | 1 | 13 |
| 20 | 2,3 | Type A | 0 | 1 | 6 |
| 21 | 2,3 | Type A | 0 | 2 | 4 |
| 22 | 2,3 | Type B | 0 | 4 | 7 |
| 23 | 2,3 | Type B | 0 | 8 | 4 |

FIG. 5

TDRA Table 610

| Row index | PUSCH mapping type | $K_2$ | SLIV |
|---|---|---|---|
| 0 | Type A/B | (0, 1, 2, ..., 32) | (0, 1, 2, ..., 127) |
| 1 | Type A/B | (0, 1, 2, ..., 32) | (0, 1, 2, ..., 127) |
| 2 | Type A/B | (0, 1, 2, ..., 32) | (0, 1, 2, ..., 127) |
| 3 | Type A/B | (0, 1, 2, ..., 32) | (0, 1, 2, ..., 127) |
| 4 | Type A/B | (0, 1, 2, ..., 32) | (0, 1, 2, ..., 127) |
| 5 | Type A/B | (0, 1, 2, ..., 32) | (0, 1, 2, ..., 127) |
| 6 | Type A/B | (0, 1, 2, ..., 32) | (0, 1, 2, ..., 127) |
| 7 | Type A/B | (0, 1, 2, ..., 32) | (0, 1, 2, ..., 127) |
| 8 | Type A/B | (0, 1, 2, ..., 32) | (0, 1, 2, ..., 127) |
| 9 | Type A/B | (0, 1, 2, ..., 32) | (0, 1, 2, ..., 127) |
| 10 | Type A/B | (0, 1, 2, ..., 32) | (0, 1, 2, ..., 127) |
| 11 | Type A/B | (0, 1, 2, ..., 32) | (0, 1, 2, ..., 127) |
| 12 | Type A/B | (0, 1, 2, ..., 32) | (0, 1, 2, ..., 127) |
| 13 | Type A/B | (0, 1, 2, ..., 32) | (0, 1, 2, ..., 127) |
| 14 | Type A/B | (0, 1, 2, ..., 32) | (0, 1, 2, ..., 127) |
| 15 | Type A/B | (0, 1, 2, ..., 32) | (0, 1, 2, ..., 127) |

TDRA Table 710

| Row index | PUSCH mapping type | $K_2$ | SLIV | TB mode |
|---|---|---|---|---|
| 0 | Type A/B | (0, 1, 2, ..., 32) | (0, 1, 2, ..., 127) | 0 or 1 |
| 1 | Type A/B | (0, 1, 2, ..., 32) | (0, 1, 2, ..., 127) | 0 or 1 |
| 2 | Type A/B | (0, 1, 2, ..., 32) | (0, 1, 2, ..., 127) | 0 or 1 |
| 3 | Type A/B | (0, 1, 2, ..., 32) | (0, 1, 2, ..., 127) | 0 or 1 |
| 4 | Type A/B | (0, 1, 2, ..., 32) | (0, 1, 2, ..., 127) | 0 or 1 |
| 5 | Type A/B | (0, 1, 2, ..., 32) | (0, 1, 2, ..., 127) | 0 or 1 |
| 6 | Type A/B | (0, 1, 2, ..., 32) | (0, 1, 2, ..., 127) | 0 or 1 |
| 7 | Type A/B | (0, 1, 2, ..., 32) | (0, 1, 2, ..., 127) | 0 or 1 |
| 8 | Type A/B | (0, 1, 2, ..., 32) | (0, 1, 2, ..., 127) | 0 or 1 |
| 9 | Type A/B | (0, 1, 2, ..., 32) | (0, 1, 2, ..., 127) | 0 or 1 |
| 10 | Type A/B | (0, 1, 2, ..., 32) | (0, 1, 2, ..., 127) | 0 or 1 |
| 11 | Type A/B | (0, 1, 2, ..., 32) | (0, 1, 2, ..., 127) | 0 or 1 |
| 12 | Type A/B | (0, 1, 2, ..., 32) | (0, 1, 2, ..., 127) | 0 or 1 |
| 13 | Type A/B | (0, 1, 2, ..., 32) | (0, 1, 2, ..., 127) | 0 or 1 |
| 14 | Type A/B | (0, 1, 2, ..., 32) | (0, 1, 2, ..., 127) | 0 or 1 |
| 15 | Type A/B | (0, 1, 2, ..., 32) | (0, 1, 2, ..., 127) | 0 or 1 |

TDRA Table 810 for TB mode 0

| Row index | PUSCH mapping type | $K_2$ | SLIV |
|---|---|---|---|
| 0 | Type A/B | (0, 1, ..., 32) | (0, 1, ..., 127) |
| 1 | Type A/B | (0, 1, ..., 32) | (0, 1, ..., 127) |
| 2 | Type A/B | (0, 1, ..., 32) | (0, 1, ..., 127) |
| 3 | Type A/B | (0, 1, ..., 32) | (0, 1, ..., 127) |
| 4 | Type A/B | (0, 1, ..., 32) | (0, 1, ..., 127) |
| 5 | Type A/B | (0, 1, ..., 32) | (0, 1, ..., 127) |
| 6 | Type A/B | (0, 1, ..., 32) | (0, 1, ..., 127) |
| 7 | Type A/B | (0, 1, ..., 32) | (0, 1, ..., 127) |
| 8 | Type A/B | (0, 1, ..., 32) | (0, 1, ..., 127) |
| 9 | Type A/B | (0, 1, ..., 32) | (0, 1, ..., 127) |
| 10 | Type A/B | (0, 1, ..., 32) | (0, 1, ..., 127) |
| 11 | Type A/B | (0, 1, ..., 32) | (0, 1, ..., 127) |
| 12 | Type A/B | (0, 1, ..., 32) | (0, 1, ..., 127) |
| 13 | Type A/B | (0, 1, ..., 32) | (0, 1, ..., 127) |
| 14 | Type A/B | (0, 1, ..., 32) | (0, 1, ..., 127) |
| 15 | Type A/B | (0, 1, ..., 32) | (0, 1, ..., 127) |

FIG. 8A

TDRA Table 860 for TB mode 1

| Row index | PUSCH mapping type | $K_2$ | SLIV |
|---|---|---|---|
| 0 | Type A/B | (0, 1, ..., 32) | (0, 1, ..., 127) |
| 1 | Type A/B | (0, 1, ..., 32) | (0, 1, ..., 127) |
| 2 | Type A/B | (0, 1, ..., 32) | (0, 1, ..., 127) |
| 3 | Type A/B | (0, 1, ..., 32) | (0, 1, ..., 127) |
| 4 | Type A/B | (0, 1, ..., 32) | (0, 1, ..., 127) |
| 5 | Type A/B | (0, 1, ..., 32) | (0, 1, ..., 127) |
| 6 | Type A/B | (0, 1, ..., 32) | (0, 1, ..., 127) |
| 7 | Type A/B | (0, 1, ..., 32) | (0, 1, ..., 127) |
| 8 | Type A/B | (0, 1, ..., 32) | (0, 1, ..., 127) |
| 9 | Type A/B | (0, 1, ..., 32) | (0, 1, ..., 127) |
| 10 | Type A/B | (0, 1, ..., 32) | (0, 1, ..., 127) |
| 11 | Type A/B | (0, 1, ..., 32) | (0, 1, ..., 127) |
| 12 | Type A/B | (0, 1, ..., 32) | (0, 1, ..., 127) |
| 13 | Type A/B | (0, 1, ..., 32) | (0, 1, ..., 127) |
| 14 | Type A/B | (0, 1, ..., 32) | (0, 1, ..., 127) |
| 15 | Type A/B | (0, 1, ..., 32) | (0, 1, ..., 127) |

FIG. 8B

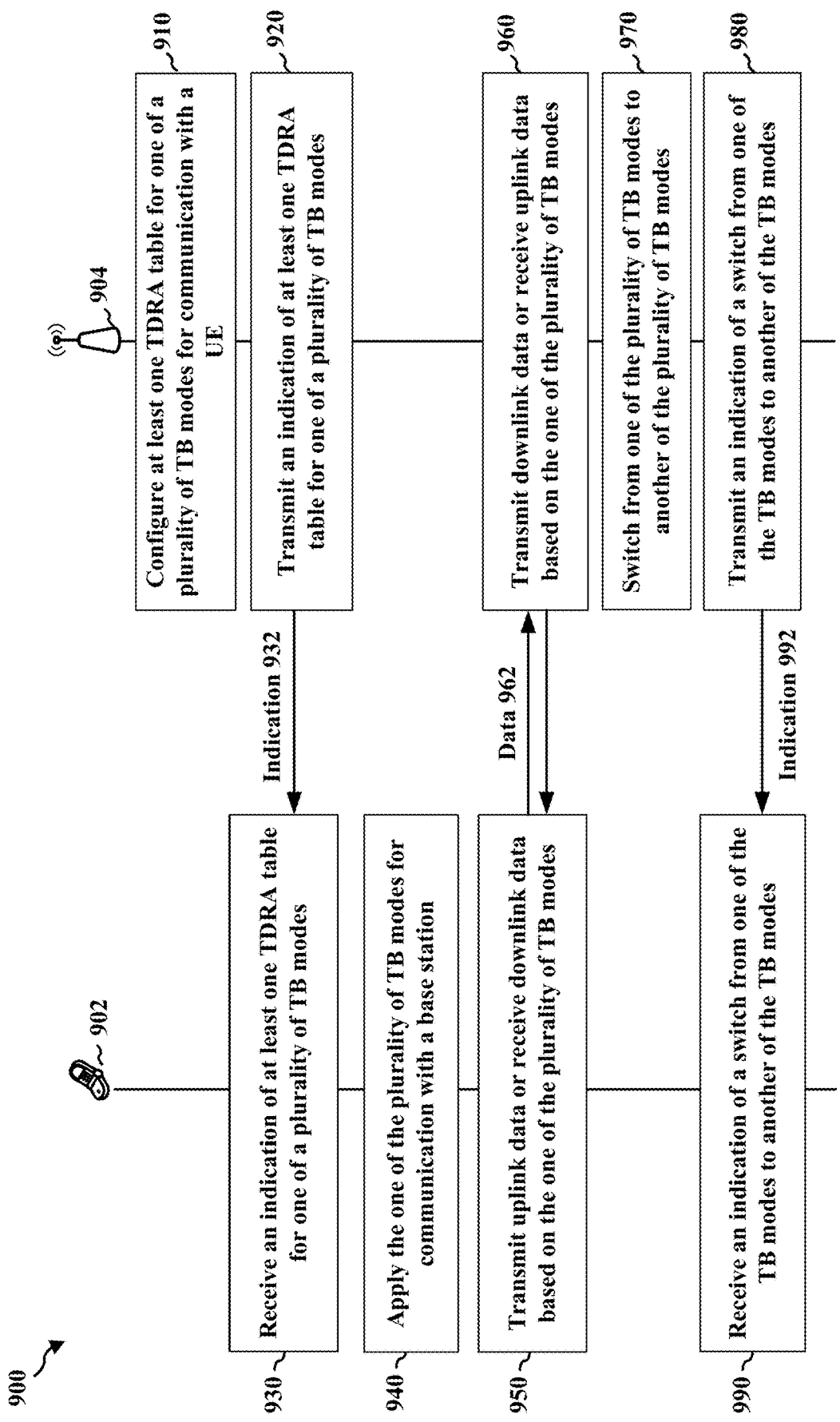

DYNAMIC SWITCHING BETWEEN TB REPETITIONS AND MULTIPLE TBS VIA DCI

TECHNICAL FIELD

The present disclosure relates generally to communication systems, and more particularly, to transport block (TB) modes in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, an indication of at least one time domain resource allocation (TDRA) table for one of a plurality of transport block (TB) modes for communication with the base station, the plurality of TB modes including at least one of a first TB mode or a second TB mode, the first TB mode corresponding to multiple TBs via a single grant, the second TB mode corresponding to a single TB with at least one repetition via the single grant. The apparatus may also apply, based on the at least one TDRA table, the one of the plurality of TB modes for the communication with the base station. Additionally, the apparatus may transmit uplink data to the base station, or receive downlink data from the base station, based on the one of the plurality of TB modes. The apparatus may also receive, from the base station, an indication of a switch from the one of the plurality of TB modes to another of the plurality of TB modes.

In another aspect of the disclosure, a method, a computer-readable medium, and an apparatus are provided. The apparatus may be a base station. The apparatus may configure at least one time domain resource allocation (TDRA) table for a plurality of transport block (TB) modes for communication with a user equipment (UE), the plurality of TB modes including at least one of a first TB mode or a second TB mode, the first TB mode corresponding to multiple TBs via a single grant, the second TB mode corresponding to a single TB with at least one repetition via the single grant. The apparatus may also transmit, to the UE, an indication of the at least one TDRA table for one of the plurality of TB modes. Further, the apparatus may transmit downlink data to the UE, or receive uplink data from the UE, based on the one of the plurality of TB modes. The apparatus may also switch from the one of the plurality of TB modes to another of the plurality of TB modes. The apparatus may also transmit, to the UE, an indication of the switch from the one of the plurality of TB modes to the another of the plurality of TB modes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating an example TDRA table in accordance with one or more techniques of the present disclosure.

FIG. 6 is a diagram illustrating an example TDRA table in accordance with one or more techniques of the present disclosure.

FIG. 8A is a diagram illustrating an example TDRA table in accordance with one or more techniques of the present disclosure.

FIG. 8B is a diagram illustrating an example TDRA table in accordance with one or more techniques of the present disclosure.

FIG. 9 is a diagram illustrating example communication between a UE and a base station in accordance with one or more techniques of the present disclosure.

DETAILED DESCRIPTION

Figure 1:
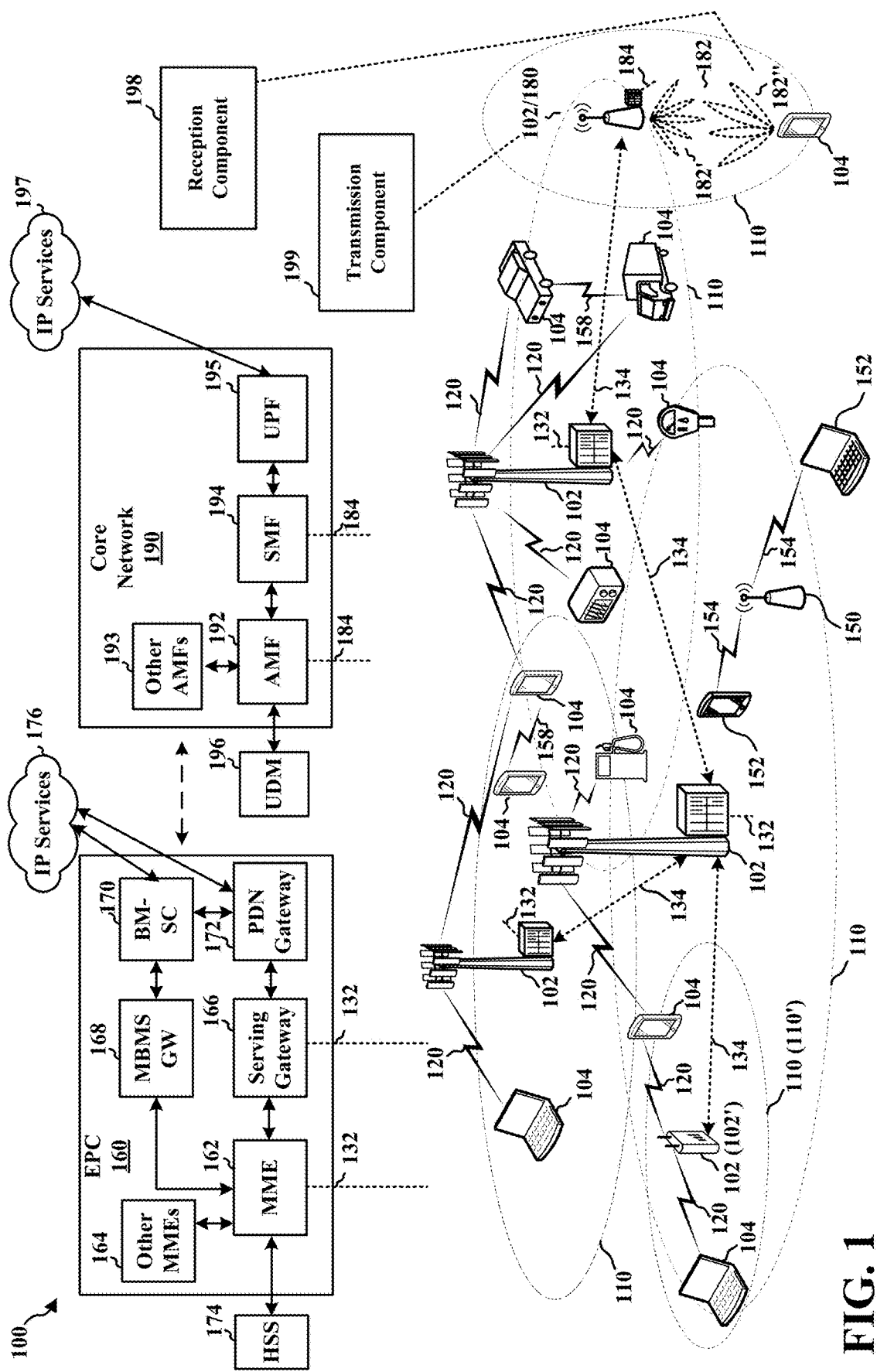
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a reception component 198 configured to receive, from a base station, an indication of at least one time domain resource allocation (TDRA) table for one of a plurality of transport block (TB) modes for communication with the base station, the plurality of TB modes including at least one of a first TB mode or a second TB mode, the first TB mode corresponding to multiple TBs via a single grant, the second TB mode corresponding to a single TB with at least one repetition via the single grant. Reception component 198 may also be configured to apply, based on the at least one TDRA table, the one of the plurality of TB modes for the communication with the base station. Reception component 198 may also be configured to transmit uplink data to the base station, or receive downlink data from the base station, based on the one of the plurality of TB modes. Reception component 198 may also be configured to receive, from the base station, an indication of a switch from the one of the plurality of TB modes to another of the plurality of TB modes.

Referring again to FIG. 1, in certain aspects, the base station 180 may include a transmission component 199 configured to configure at least one time domain resource allocation (TDRA) table for a plurality of transport block (TB) modes for communication with a user equipment (UE), the plurality of TB modes including at least one of a first TB mode or a second TB mode, the first TB mode corresponding to multiple TBs via a single grant, the second TB mode corresponding to a single TB with at least one repetition via the single grant. Transmission component 199 may also be configured to transmit, to the UE, an indication of the at least one TDRA table for one of the plurality of TB modes. Transmission component 199 may also be configured to transmit downlink data to the UE, or receive uplink data from the UE, based on the one of the plurality of TB modes. Transmission component 199 may also be configured to switch from the one of the plurality of TB modes to another of the plurality of TB modes. Transmission component 199 may also be configured to transmit, to the UE, an indication of the switch from the one of the plurality of TB modes to the another of the plurality of TB modes.

Although the following description may be focused on 5G NR, the concepts described herein may be applicable to other similar areas, such as LTE, LTE-A, CDMA, GSM, and other wireless technologies.

Figure 2:
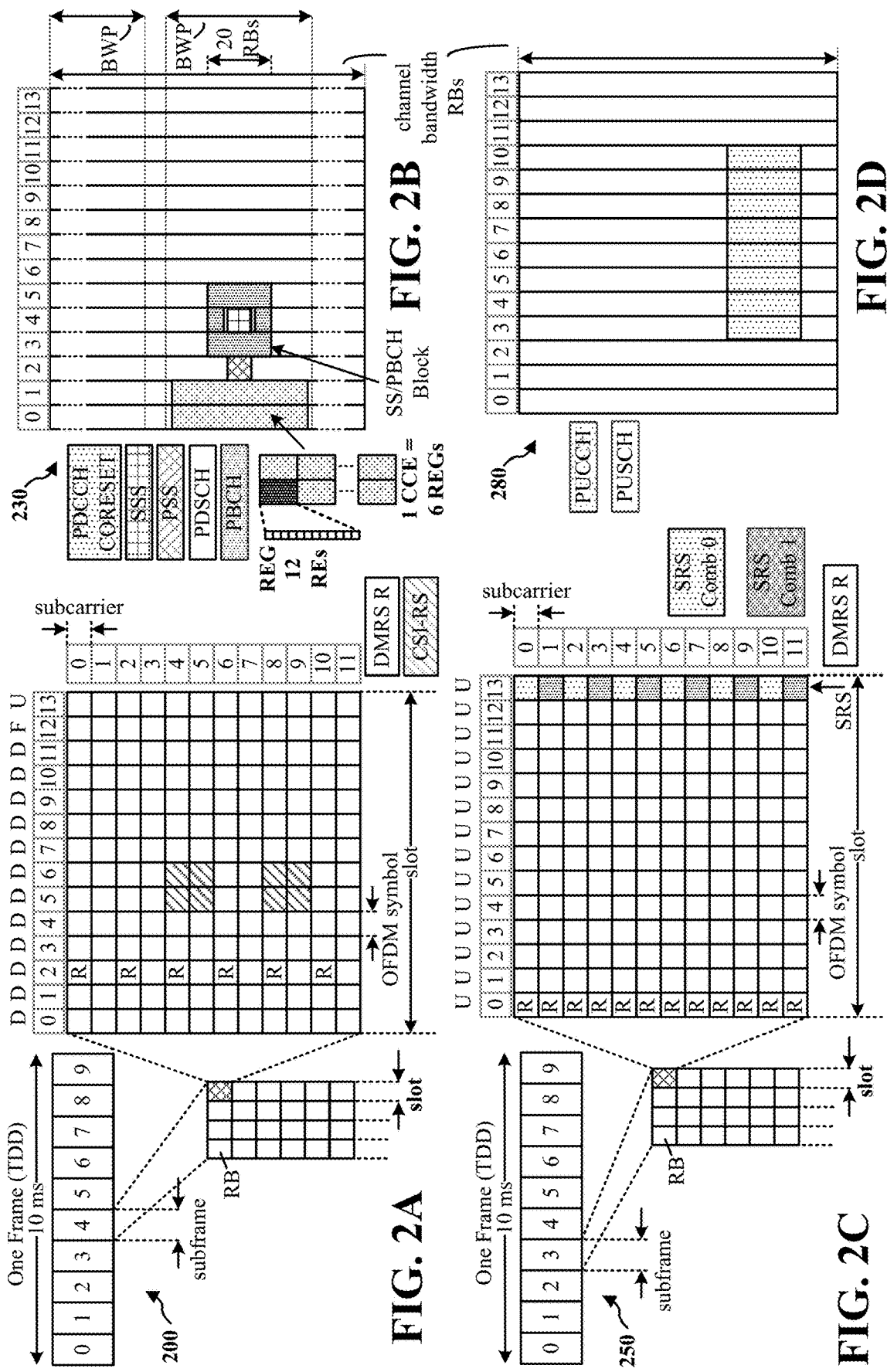
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
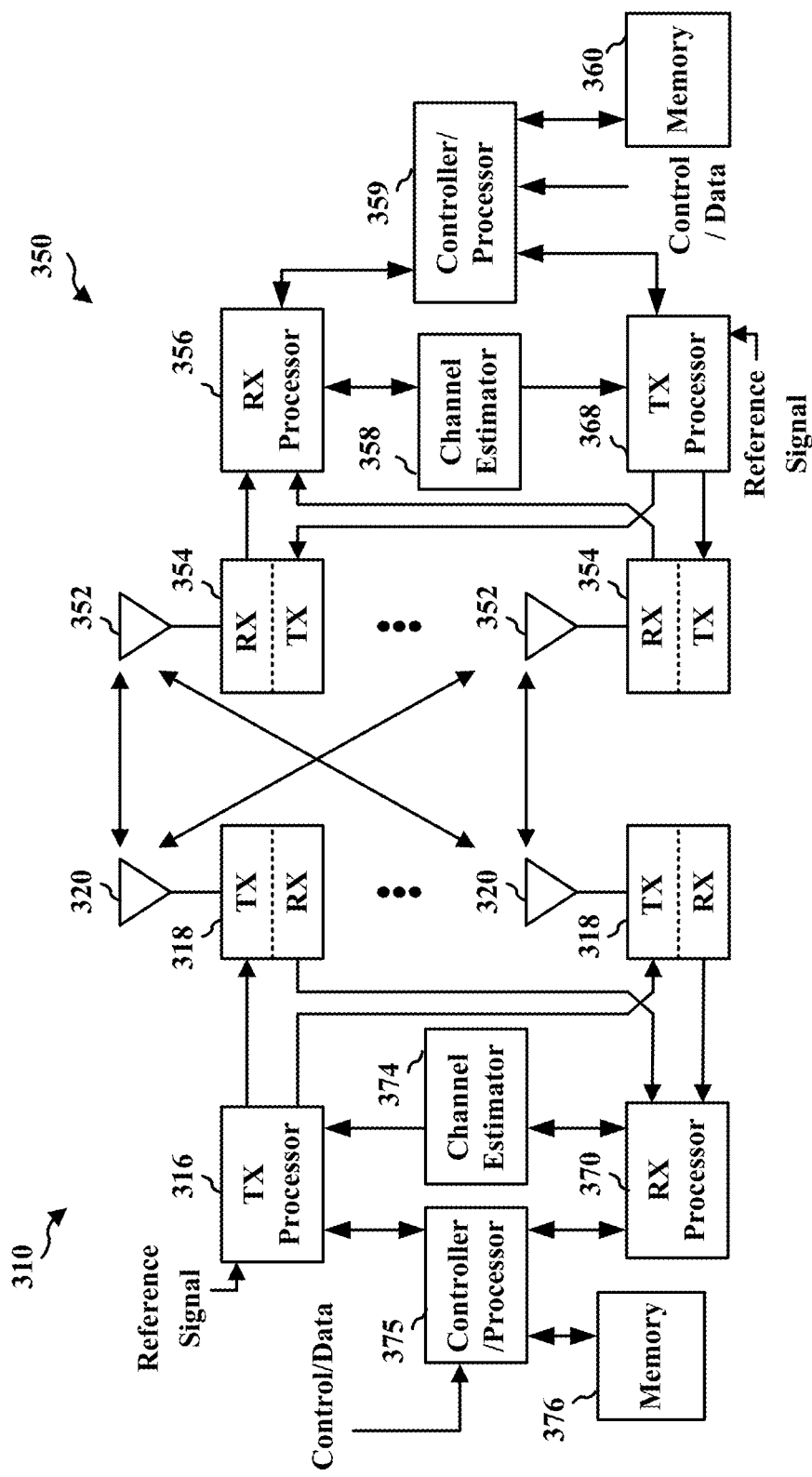
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communication include a number of different types of downlink grants that are associated with downlink control information (DCI). For instance, aspects of wireless communication may include multiple physical downlink shared channel (PDSCH) grants that are scheduled with a single DCI. These multiple PDSCH grants (multi-PDSCHs grants) that are scheduled with a single DCI may be supported for certain types of subcarrier spacing (SCS), e.g., SCS of 480 kHz or 960 kHz. Other types of SCS may or may not support multi-PDSCHs grants scheduled with a single DCI, e.g., SCS 120 kHz.

In some aspects, for certain types of SCS, there may be a maximum number of PDSCHs that are scheduled with a single DCI. For instance, the maximum number of PDSCHs that may be scheduled with a single DCI for certain SCS, e.g., SCS of 480 and 960 kHz, is eight (8) PDSCHs. There may also be some types of restrictions for certain types of SCS. For example, for SCS of 480 kHz, the maximum number of PDSCHs scheduled with a single DCI may be restricted to four (4). In this instance, there may be a UE capability to select between a maximum number of PDSCHs scheduled with a single DCI, e.g., a UE capability to select between four (4) and eight (8) maximum PDSCHs scheduled with a single DCI for a 480 kHz SCS. Additionally, some multi-PDSCH grants for scheduling certain types of SCS, e.g., 120 kHz SCS, may be uncertain.

Figure 4:
FIG. 4 is a diagram illustrating an example time domain resource allocation (TDRA) table in accordance with one or more techniques of the present disclosure.

In some types of wireless communication, a single transport block (TB) may be repeated over multiple allocations via a single grant. For instance, a single TB may be repeated over multiple allocations when the same start and length indicator value (SLIV) is repeated in a time domain resource allocation (TDRA) table. Moreover, there may be a number of different types of TDRA tables utilized for TB block allocations. FIGS. 4 and 5 below illustrate different examples of TDRA tables utilized with PDSCH grants.

FIG. 4 illustrates a diagram 400 of one example of a TDRA table. More specifically, diagram 400 is a TDRA table that includes a default PUSCH time domain resource allocation for a normal cyclic prefix (CP). As shown in FIG. 4, TDRA table 410 includes a number of columns including a row index, a PUSCH mapping type (e.g., Type A or Type B), a slot offset ($K_2$), a starting symbol (S), and an allocation length (L). In some instances, a UE may utilize the TDRA table 410 in FIG. 4 for a default PUSCH TDRA for a normal CP. For example, if a PUSCH TDRA list is not provided in a PUSCH common configuration, a UE may use the values of S and L provided in TDRA table 410.

FIG. 5 illustrates a diagram 500 of another example of a TDRA table. More specifically, diagram 500 is a TDRA table include a default PUSCH time domain resource allocation for a normal cyclic prefix (CP). As shown in FIG. 5, TDRA table 510 includes a number of columns including a row index, a DMRS Type A position (dmrs-TypeA-Position), a PUSCH mapping type (e.g., Type A or Type B), a slot offset ($K_0$), a starting symbol (S), and an allocation length (L). FIG. 5 may define which PDSCH time domain resource allocation configuration for a UE to apply. In some instances, a UE may utilize the TDRA table 510 in FIG. 5 for a default PUSCH TDRA for a normal CP. For example, for an operation with a shared spectrum channel access, a UE may use the values of S and L provided in TDRA table 510.

TDRA tables may also be utilized for different types of configurations, e.g., RRC configurations. FIG. 6 illustrates a diagram 600 of one example of a TDRA table for these types of configurations. More specifically, FIG. 6 displays one example of a TDRA table 610 that is RRC configured for a single TB grant. As shown in FIG. 6, TDRA table 610 includes a number of columns including a row index, a PUSCH mapping type (e.g., Type A or Type B), a slot offset ($K_2$), and a SLIV.

As indicated above, there may be multiple types of TB modes, e.g., a TB mode for scheduling multiple TBs via single DCI and a TB mode for scheduling a same TB repetition over multiple allocations. For instance, one of the multiple TB modes may be configured via an RRC configuration. Further, there may be a switch between the TB modes via an RRC configuration. However, a switch via an RRC configuration may not allow for an on-the-fly or dynamic switch capability. Based on the above, it may be beneficial to allow for another type of switch between two TB modes, e.g., a switch from scheduling multiple TBs via a single DCI to scheduling a same TB repetition over multiple allocations, or vice versa. For instance, it may be beneficial to allow for dynamic switching between two TB modes, e.g., a dynamic switch from scheduling multiple TBs via a single DCI to scheduling a same TB repetition over multiple allocations, or vice versa.

Aspects of the present disclosure may provide a novel switching capability between different types of TB modes. For instance, aspects of the present disclosure may switch from one TB mode, e.g., a TB mode for scheduling multiple TBs via a single DCI, to another TB mode, e.g., a TB mode for scheduling a same TB repetition over multiple allocations of a single DCI, or vice versa. Further, aspects of the present disclosure may provide an on-the-fly or dynamic switching capability between different types of TB modes. For example, aspects of the present disclosure may allow for dynamic switching between two TB modes, e.g., a dynamic switch from scheduling multiple TBs via a single DCI to scheduling a same TB repetition over multiple allocations of a single DCI, or vice versa.

Aspects of the present disclosure may include a number of different TDRA tables for scheduling different types of TB modes. In some instances, aspects of the present disclosure may include a single TDRA table for scheduling different types of TB modes. For instance, aspects of the present disclosure may utilize a single TDRA table for scheduling multiple TBs via a single DCI, as well as a single TDRA table for scheduling a same TB repetition over multiple allocations of a single DCI. In order to do so, aspects of the present disclosure may utilize a single TDRA table for multiple TB modes, i.e., a single TDRA table for scheduling multiple TBs via a single DCI and/or for scheduling a same TB repetition over multiple allocations of a single DCI.

In some aspects, the present disclosure may include a single TDRA table that introduces a new column to the table, e.g., an RRC table, to distinguish between different TB modes. For instance, aspects of the present disclosure may include a single TDRA table with a column to distinguish between a first TB mode and a second TB mode, e.g., a TB mode for scheduling multiple TBs via a single grant and a TB mode for scheduling a single TB with at least one repetition via a single grant. The column in the single TDRA table may also be a flag in the single TDRA table. In some instances, such as where different SLIVs with a flag indicate a TB repetition mode, the TB size may be determined based on a first SLIV. Additionally, the TB size may be determined based on the shortest length among all the SLIVs in the same row.

Figure 7:
FIG. 7 is a diagram illustrating an example TDRA table in accordance with one or more techniques of the present disclosure.

FIG. 7 illustrates a diagram 700 of one example of a TDRA table for different TB modes. As shown in FIG. 7, diagram 700 includes a number of columns including a row index, a PUSCH mapping type (e.g., Type A or Type B), a slot offset ($K_2$), a SLIV, and a TB mode value. More specifically, FIG. 7 displays a single TDRA table 710 that utilizes a column to distinguish between a first TB mode (e.g., scheduling multiple TBs via a single grant) and a second TB mode (e.g., scheduling a single TB with at least one repetition via a single grant). For instance, a TB mode value of zero (0) may correspond to the first TB mode (e.g., multiple TBs via a single grant) and TB mode value of one (1) may correspond to a second TB mode (e.g., a single TB with at least one repetition via a single grant).

In some instances, aspects of the present disclosure may include a single TDRA table that utilizes an RRC configuration to indicate the rows dedicated for each TB mode. For instance, a single TDRA table may use an RRC configuration to indicate that certain rows are dedicated to a TB mode for scheduling multiple TBs via a single grant, as well as certain rows are dedicated to a TB mode for scheduling a single TB with at least one repetition via a single grant. For example, the first M rows may be utilized for scheduling a single TB with at least one repetition via a single grant, and the last N rows may be utilized for scheduling multiple TBs via a single grant. The above utilization of different rows for different types of TB modes may be applied in the case of different SLIV sizes.

In some aspects, the present disclosure may include a single TDRA table that utilizes different structures of the TDRA table for different types of TB modes. For example, the rows in the TDRA table with TB repetitions of a single TB may have a single SLIV and a column to indicate a number of repetitions of the single TB. Also, the rows in the TDRA table with different TBs may have multiple SLIVs. In one instance, one or more first rows and one or more first columns in the single TDRA table may be associated with a structure of a first TB mode, and one or more second rows and one or more second columns in the single TDRA table may be associated with a structure of a second TB mode. Moreover, each of the first rows or each of the first columns may include multiple SLIVs for the multiple TBs, each of the second rows may include a single SLIV for the single TB, and each of the second columns may indicate a number of repetitions of the single TB.

In some instances, aspects of the present disclosure may include a single bit indication in DCI and/or a MAC-CE to switch between two TB modes. For example, DCI or a MAC-CE associated with the single TDRA table may include a single bit that indicates a switch from the first TB mode to the second TB mode and/or a switch from the second TB mode to the first TB mode. As indicated herein, the first TB mode may correspond to scheduling multiple TBs via a single grant, and the second TB mode may correspond to scheduling a single TB with at least one repetition via a single grant. Additionally, aspects of the present disclosure may utilize a same TB size determination, such as in the case of different SLIVs with TB repetitions.

Aspects of the present disclosure may also utilize multiple TDRA tables for scheduling different types of TB modes. For instance, aspects of the present disclosure may utilize one TDRA table for scheduling one type of TB mode, e.g., a first TDRA table for scheduling a first TB mode, and another TDRA table for scheduling another type of TB mode, e.g., a second TDRA table for scheduling a second TB mode. As indicated herein, the first TB mode may correspond to multiple TBs via a single grant, and the second TB mode may correspond to a single TB with at least one repetition via a single grant. Aspects of the present disclosure may also utilize dynamic switching between the two TDRA tables for each TB mode, e.g., dynamic switching from the first TDRA table for the first TB mode to the second TDRA table for the second TB mode, or vice versa.

In some instances, aspects of the present disclosure may utilize two TDRA tables, i.e., each for one TB mode, where a DCI bit, a MAC-CE, or an RRC configuration may indicate which TDRA table to be used for which TB mode. For instance, a DCI or MAC-CE associated with the TDRA tables may include at least one bit that indicates the first TDRA table and/or the second TDRA table. Further, the multiple TDRA tables may utilize different structures of the TDRA tables for different types of TB modes. For example, one or more rows and one or more columns in a first TDRA table may be associated with a structure of a first TB mode (e.g., multiple TBs via a single grant), and one or more rows and one or more columns in a second TDRA table may be associated with a structure of a second TB mode (e.g., single TB with at least one repetition via a single grant).

FIGS. 8A and 8B illustrate diagrams 800 and 850, respectively, of one example of multiple TDRA tables for scheduling different types of TB modes. As shown in FIGS. 8A and 8B, diagrams 800 and 850 include a number of columns including a row index, a PUSCH mapping type (e.g., Type A or Type B), a slot offset ($K_2$), and a SLIV. More specifically, FIG. 8A displays a TDRA table 810 to schedule a first TB mode (TB mode 0) (e.g., multiple TBs via a single grant) and FIG. 8B displays another TDRA table 860 to schedule a second TB mode (TB mode 1) (e.g., a single TB with at least one repetition via a single grant). In contrast to FIG. 7, FIGS. 8A and 8B do not include a separate column in the TRDA tables for a TB mode value. Rather, the TDRA table 810 in FIG. 8A is utilized for scheduling one TB mode (TB mode 0) and the TDRA table 860 in FIG. 8B is utilized for scheduling another TB mode (TB mode 1). Accordingly, TDRA table 810 corresponds to scheduling a first TB mode (TB mode 0) (e.g., multiple TBs via a single grant) and TDRA table 860 corresponds to scheduling a second TB mode (TB mode 1) (e.g., a single TB with at least one repetition via a single grant).

As indicated herein, aspects of the present disclosure may provide for dynamic switching between two TB modes of operation: (1) multiple TBs using a single DCI across different slots; and (2) TB repetition across different slots. In some instances, the dynamic switching between TB modes may be performed via a TDRA table. For example, for 60 GHz and an SCS of 480 kHz or 960 kHz, a single DCI may be able to schedule multiple TBs across multiple slots. Aspects of the present disclosure may allow for TB modes with multiple TBs via a single grant. In addition, aspects of the present disclosure may allow for TB modes with a single TB including at least one TB repetition via a single grant. The switching between the multiple TBs and the single TB including a repetition may be performed dynamically or on-the-fly.

FIG. 9 is a diagram 900 illustrating example communication between a UE 902 and a base station 904.

At 910, base station 904 may configure at least one time domain resource allocation (TDRA) table for a plurality of transport block (TB) modes for communication with a user equipment (UE), the plurality of TB modes including at least one of a first TB mode or a second TB mode, the first TB mode corresponding to multiple TBs via a single grant, the second TB mode corresponding to a single TB with at least one repetition via the single grant.

At 920, base station 904 may transmit, to the UE, an indication of the at least one TDRA table for one of the plurality of TB modes, e.g., indication 932.

At 930, UE 902 may receive, from a base station, an indication of at least one time domain resource allocation (TDRA) table for one of a plurality of transport block (TB) modes for communication with the base station, e.g., indication 932, the plurality of TB modes including at least one of a first TB mode or a second TB mode, the first TB mode corresponding to multiple TBs via a single grant, the second TB mode corresponding to a single TB with at least one repetition via the single grant. The indication of the at least one TDRA table may be received via at least one of downlink control information (DCI), radio resource control (RRC) signaling, or a medium access control (MAC) control element (MAC-CE). In some instances, the first TB mode may correspond to the multiple TBs via a single downlink control information (DCI). Also, the second TB mode may correspond to the at least one repetition of the single TB via at least one allocation of the single grant.

In some aspects, the at least one TDRA table for the plurality of TB modes may correspond to a single TDRA table for the first TB mode and the second TB mode. A column or a flag in the single TDRA table may identify the first TB mode or the second TB mode. The column or the flag in the single TDRA table may be associated with a plurality of start and length indicator values (SLIVs), and a size of the single TB may be based on a first SLIV of the plurality of SLIVs or a shortest SLIV of the plurality of SLIVs in a same row of the single TDRA table. Also, a radio resource control (RRC) configuration may indicate one or more rows in the single TDRA table associated with the first TB mode and one or more rows in the single TDRA table associated with the second TB mode.

In some instances, one or more first rows and one or more first columns in the single TDRA table may be associated with a structure of the first TB mode, and one or more second rows and one or more second columns in the single TDRA table may be associated with a structure of the second TB mode. Each of the one or more first rows or each of the one or more first columns may include multiple start and length indicator values (SLIVs) for the multiple TBs, each of the one or more second rows may include a single SLIV for the single TB, and each of the one or more second columns may indicate a number of repetitions of the single TB. Also, downlink control information (DCI) or a medium access control (MAC) control element (MAC-CE) associated with the single TDRA table may include a single bit that indicates a switch from the first TB mode to the second TB mode or a switch from the second TB mode to the first TB mode.

Additionally, the at least one TDRA table for the plurality of TB modes may correspond to a first TDRA table for the first TB mode and a second TDRA table for the second TB mode. Also, downlink control information (DCI) or a medium access control (MAC) control element (MAC-CE) associated with the at least one TDRA table may include at least one bit that indicates the first TDRA table or the second TDRA table. One or more rows and one or more columns in the first TDRA table may be associated with a structure of the first TB mode, and one or more rows and one or more columns in the second TDRA table may be associated with a structure of the second TB mode.

At 940, UE 902 may apply, based on the at least one TDRA table, the one of the plurality of TB modes for the communication with the base station.

At 950, UE 902 may transmit uplink data to the base station, or receive downlink data from the base station, e.g., data 962, based on the one of the plurality of TB modes.

At 960, base station 904 may transmit downlink data to the UE, or receive uplink data from the UE, e.g., data 962, based on the one of the plurality of TB modes.

At 970, base station 904 may switch from the one of the plurality of TB modes to another of the plurality of TB modes.

At 980, base station 904 may transmit, to the UE, an indication of the switch from the one of the plurality of TB modes to the another of the plurality of TB modes, e.g., indication 992.

At 990, UE 902 may receive, from the base station, an indication of a switch from the one of the plurality of TB modes to another of the plurality of TB modes, e.g., indication 992.

Figure 10:
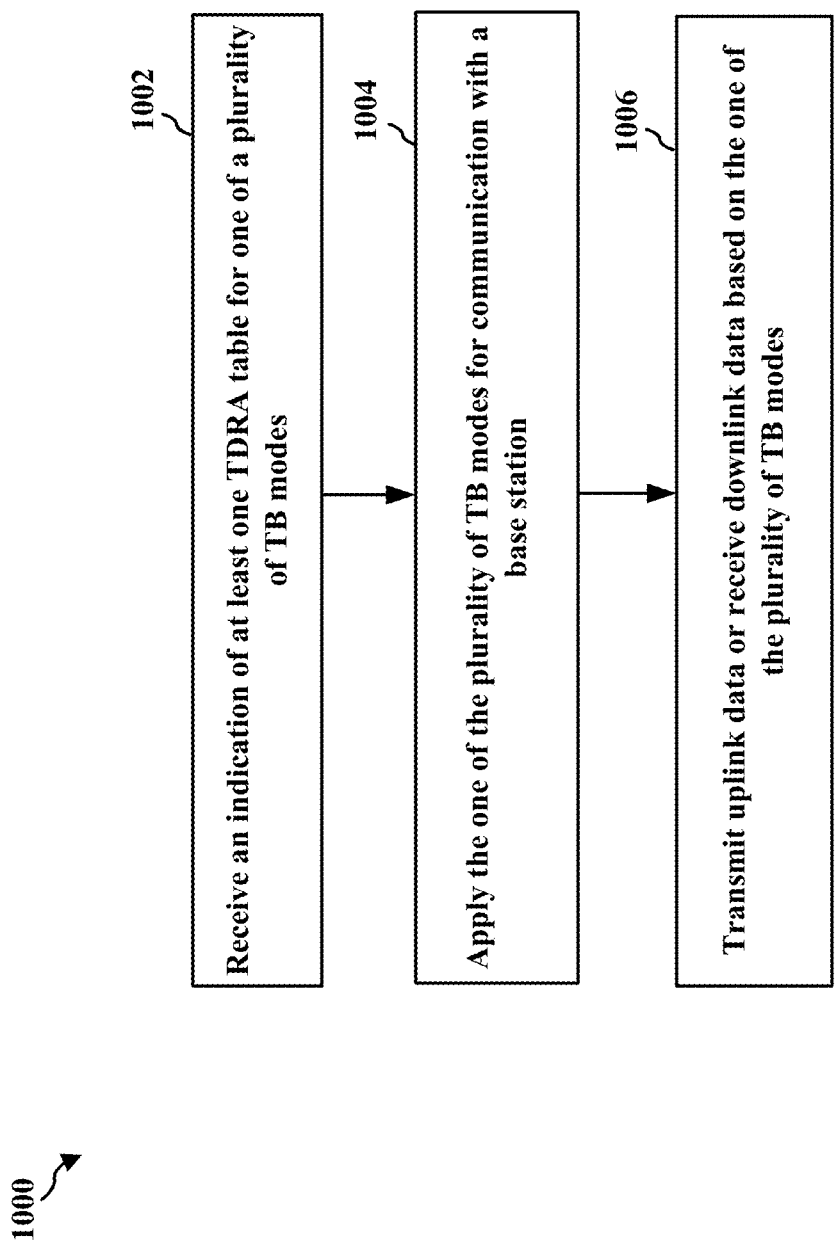
FIG. 10 is a flowchart of a method of wireless communication.

FIG. 10 is a flowchart 1000 of a method of wireless communication. The method may be performed by a UE or a component of a UE (e.g., the UE 104, 350, 902; the apparatus 1402). The methods described herein may provide a number of benefits, such as improving communication signaling, resource utilization, and/or power savings.

At 1002, the UE may receive, from a base station, an indication of at least one TDRA table for one of a plurality of TB modes for communication with the base station, the plurality of TB modes including at least one of a first TB mode or a second TB mode, the first TB mode corresponding to multiple TBs via a single grant, the second TB mode corresponding to a single TB with at least one repetition via the single grant, as described in connection with the examples in FIGS. 4-8B. For example, UE 902 may receive, from a base station, an indication of at least one TDRA table for one of a plurality of TB modes for communication with the base station, the plurality of TB modes including at least one of a first TB mode or a second TB mode, the first TB mode corresponding to multiple TBs via a single grant, the second TB mode corresponding to a single TB with at least one repetition via the single grant, as described in connection with 930 in FIG. 9. Further, 1002 may be performed by determination component 1440 in FIG. 14. The indication of the at least one TDRA table may be received via at least one of downlink control information (DCI), radio resource control (RRC) signaling, or a medium access control (MAC) control element (MAC-CE). In some instances, the first TB mode may correspond to the multiple TBs via a single downlink control information (DCI). Also, the second TB mode may correspond to the at least one repetition of the single TB via at least one allocation of the single grant.

In some aspects, the at least one TDRA table for the plurality of TB modes may correspond to a single TDRA table for the first TB mode and the second TB mode. A column or a flag in the single TDRA table may identify the first TB mode or the second TB mode. The column or the flag in the single TDRA table may be associated with a plurality of start and length indicator values (SLIVs), and a size of the single TB may be based on a first SLIV of the plurality of SLIVs or a shortest SLIV of the plurality of SLIVs in a same row of the single TDRA table. Also, a radio resource control (RRC) configuration may indicate one or more rows in the single TDRA table associated with the first TB mode and one or more rows in the single TDRA table associated with the second TB mode.

In some instances, one or more first rows and one or more first columns in the single TDRA table may be associated with a structure of the first TB mode, and one or more second rows and one or more second columns in the single TDRA table may be associated with a structure of the second TB mode. Each of the one or more first rows or each of the one or more first columns may include multiple start and length indicator values (SLIVs) for the multiple TBs, each of the one or more second rows may include a single SLIV for the single TB, and each of the one or more second columns may indicate a number of repetitions of the single TB. Also, downlink control information (DCI) or a medium access control (MAC) control element (MAC-CE) associated with the single TDRA table may include a single bit that indicates a switch from the first TB mode to the second TB mode or a switch from the second TB mode to the first TB mode.

Additionally, the at least one TDRA table for the plurality of TB modes may correspond to a first TDRA table for the first TB mode and a second TDRA table for the second TB mode. Also, downlink control information (DCI) or a medium access control (MAC) control element (MAC-CE) associated with the at least one TDRA table may include at least one bit that indicates the first TDRA table or the second TDRA table. One or more rows and one or more columns in the first TDRA table may be associated with a structure of the first TB mode, and one or more rows and one or more columns in the second TDRA table may be associated with a structure of the second TB mode.

At 1004, the UE may apply, based on the at least one TDRA table, the one of the plurality of TB modes for the communication with the base station, as described in connection with the examples in FIGS. 4-8B. For example, UE 902 may apply, based on the at least one TDRA table, the one of the plurality of TB modes for the communication with the base station, as described in connection with 940 in FIG. 9. Further, 1004 may be performed by determination component 1440 in FIG. 14.

At 1006, the UE may transmit uplink data to the base station, or receive downlink data from the base station, based on the one of the plurality of TB modes, as described in connection with the examples in FIGS. 4-8B. For example, UE 902 may transmit uplink data to the base station, or receive downlink data from the base station, based on the one of the plurality of TB modes, as described in connection with 950 in FIG. 9. Further, 1006 may be performed by determination component 1440 in FIG. 14.

Figure 11:
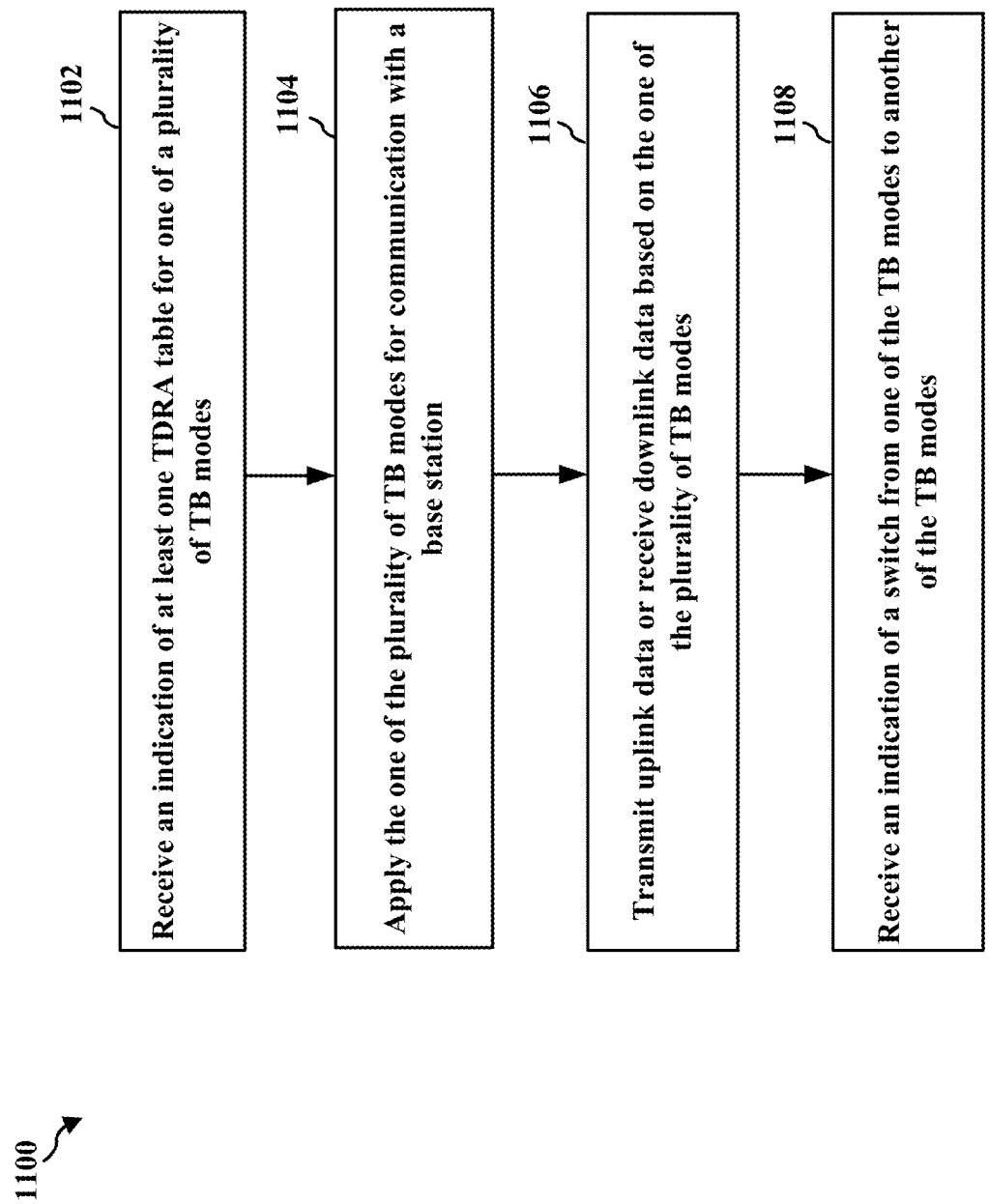
FIG. 11 is a flowchart of a method of wireless communication.

FIG. 11 is a flowchart 1100 of a method of wireless communication. The method may be performed by a UE or a component of a UE (e.g., the UE 104, 350, 902; the apparatus 1402). The methods described herein may provide a number of benefits, such as improving communication signaling, resource utilization, and/or power savings.

At 1102, the UE may receive, from a base station, an indication of at least one TDRA table for one of a plurality of TB modes for communication with the base station, the plurality of TB modes including at least one of a first TB mode or a second TB mode, the first TB mode corresponding to multiple TBs via a single grant, the second TB mode corresponding to a single TB with at least one repetition via the single grant, as described in connection with the examples in FIGS. 4-8B. For example, UE 902 may receive, from a base station, an indication of at least one TDRA table for one of a plurality of TB modes for communication with the base station, the plurality of TB modes including at least one of a first TB mode or a second TB mode, the first TB mode corresponding to multiple TBs via a single grant, the second TB mode corresponding to a single TB with at least one repetition via the single grant, as described in connection with 930 in FIG. 9. Further, 1102 may be performed by determination component 1440 in FIG. 14. The indication of the at least one TDRA table may be received via at least one of downlink control information (DCI), radio resource control (RRC) signaling, or a medium access control (MAC) control element (MAC-CE). In some instances, the first TB mode may correspond to the multiple TBs via a single downlink control information (DCI). Also, the second TB mode may correspond to the at least one repetition of the single TB via at least one allocation of the single grant.

In some aspects, the at least one TDRA table for the plurality of TB modes may correspond to a single TDRA table for the first TB mode and the second TB mode. A column or a flag in the single TDRA table may identify the first TB mode or the second TB mode. The column or the flag in the single TDRA table may be associated with a plurality of start and length indicator values (SLIVs), and a size of the single TB may be based on a first SLIV of the plurality of SLIVs or a shortest SLIV of the plurality of SLIVs in a same row of the single TDRA table. Also, a radio resource control (RRC) configuration may indicate one or more rows in the single TDRA table associated with the first TB mode and one or more rows in the single TDRA table associated with the second TB mode.

In some instances, one or more first rows and one or more first columns in the single TDRA table may be associated with a structure of the first TB mode, and one or more second rows and one or more second columns in the single TDRA table may be associated with a structure of the second TB mode. Each of the one or more first rows or each of the one or more first columns may include multiple start and length indicator values (SLIVs) for the multiple TBs, each of the one or more second rows may include a single SLIV for the single TB, and each of the one or more second columns may indicate a number of repetitions of the single TB. Also, downlink control information (DCI) or a medium access control (MAC) control element (MAC-CE) associated with the single TDRA table may include a single bit that indicates a switch from the first TB mode to the second TB mode or a switch from the second TB mode to the first TB mode.

Additionally, the at least one TDRA table for the plurality of TB modes may correspond to a first TDRA table for the first TB mode and a second TDRA table for the second TB mode. Also, downlink control information (DCI) or a medium access control (MAC) control element (MAC-CE) associated with the at least one TDRA table may include at least one bit that indicates the first TDRA table or the second TDRA table. One or more rows and one or more columns in the first TDRA table may be associated with a structure of the first TB mode, and one or more rows and one or more columns in the second TDRA table may be associated with a structure of the second TB mode.

At 1104, the UE may apply, based on the at least one TDRA table, the one of the plurality of TB modes for the communication with the base station, as described in connection with the examples in FIGS. 4-8B. For example, UE 902 may apply, based on the at least one TDRA table, the one of the plurality of TB modes for the communication with the base station, as described in connection with 940 in FIG. 9. Further, 1104 may be performed by determination component 1440 in FIG. 14.

At 1106, the UE may transmit uplink data to the base station, or receive downlink data from the base station, based on the one of the plurality of TB modes, as described in connection with the examples in FIGS. 4-8B. For example, UE 902 may transmit uplink data to the base station, or receive downlink data from the base station, based on the one of the plurality of TB modes, as described in connection with 950 in FIG. 9. Further, 1106 may be performed by determination component 1440 in FIG. 14.

At 1108, the UE may receive, from the base station, an indication of a switch from the one of the plurality of TB modes to another of the plurality of TB modes, as described in connection with the examples in FIGS. 4-8B. For example, UE 902 may receive, from the base station, an indication of a switch from the one of the plurality of TB modes to another of the plurality of TB modes, as described in connection with 990 in FIG. 9. Further, 1108 may be performed by determination component 1440 in FIG. 14.

Figure 12:
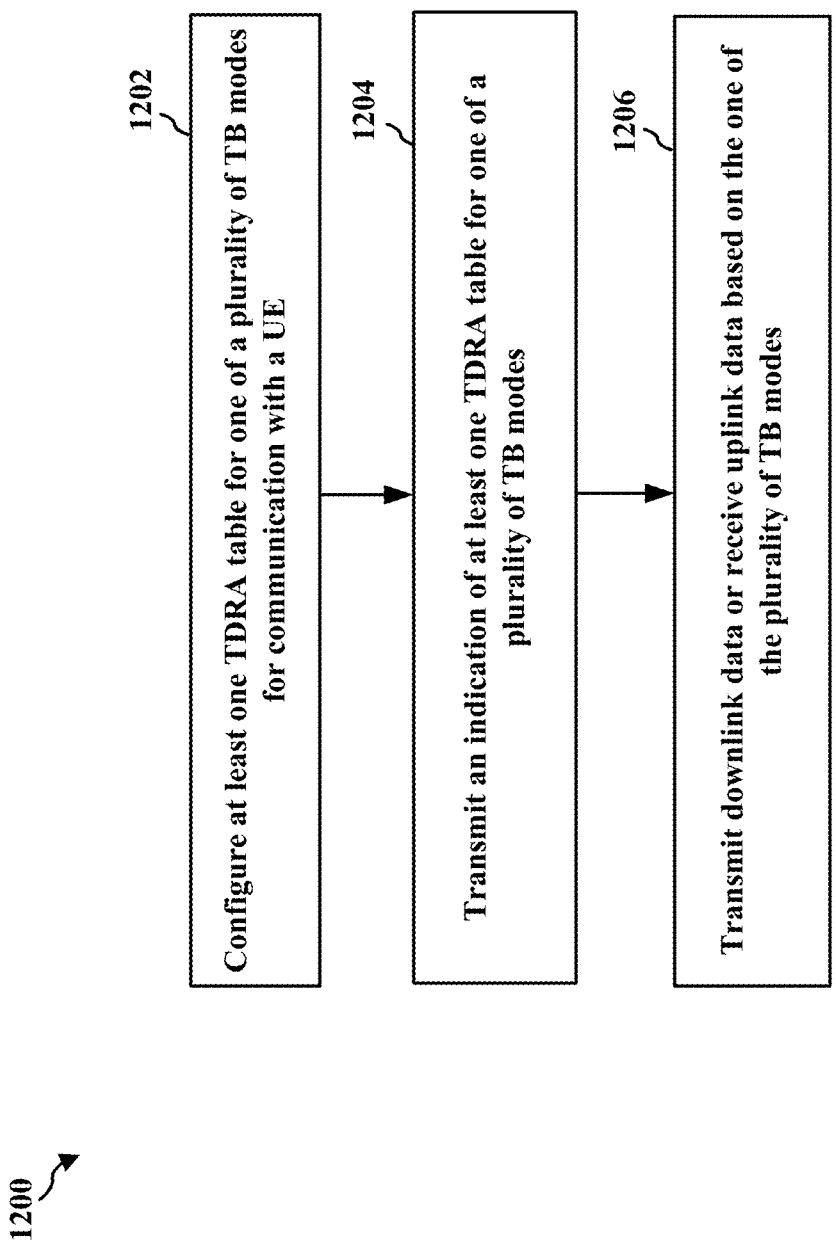
FIG. 12 is a flowchart of a method of wireless communication.

FIG. 12 is a flowchart 1200 of a method of wireless communication. The method may be performed by a base station or a component of a base station (e.g., the base station 102, 180, 310, 904; the apparatus 1502). The methods described herein may provide a number of benefits, such as improving communication signaling, resource utilization, and/or power savings.

At 1202, the base station may configure at least one TDRA table for a plurality of TB modes for communication with a UE, the plurality of TB modes including at least one of a first TB mode or a second TB mode, the first TB mode corresponding to multiple TBs via a single grant, the second TB mode corresponding to a single TB with at least one repetition via the single grant, as described in connection with the examples in FIGS. 4-8B. For example, base station 904 may configure at least one TDRA table for a plurality of TB modes for communication with a UE, the plurality of TB modes including at least one of a first TB mode or a second TB mode, the first TB mode corresponding to multiple TBs via a single grant, the second TB mode corresponding to a single TB with at least one repetition via the single grant, as described in connection with 910 in FIG. 9. Further, 1202 may be performed by determination component 1540 in FIG. 15.

At 1204, the base station may transmit, to the UE, an indication of the at least one TDRA table for one of the plurality of TB modes, as described in connection with the examples in FIGS. 4-8B. For example, base station 904 may transmit, to the UE, an indication of the at least one TDRA table for one of the plurality of TB modes, as described in connection with 920 in FIG. 9. Further, 1204 may be performed by determination component 1540 in FIG. 15. The indication of the at least one TDRA table may be transmitted via at least one of downlink control information (DCI), radio resource control (RRC) signaling, or a medium access control (MAC) control element (MAC-CE). In some instances, the first TB mode may correspond to the multiple TBs via a single downlink control information (DCI). Also, the second TB mode may correspond to the at least one repetition of the single TB via at least one allocation of the single grant.

In some aspects, the at least one TDRA table for the plurality of TB modes may correspond to a single TDRA table for the first TB mode and the second TB mode. A column or a flag in the single TDRA table may identify the first TB mode or the second TB mode. The column or the flag in the single TDRA table may be associated with a plurality of start and length indicator values (SLIVs), and a size of the single TB may be based on a first SLIV of the plurality of SLIVs or a shortest SLIV of the plurality of SLIVs in a same row of the single TDRA table. Also, a radio resource control (RRC) configuration may indicate one or more rows in the single TDRA table associated with the first TB mode and one or more rows in the single TDRA table associated with the second TB mode.

In some instances, one or more first rows and one or more first columns in the single TDRA table may be associated with a structure of the first TB mode, and one or more second rows and one or more second columns in the single TDRA table may be associated with a structure of the second TB mode. Each of the one or more first rows or each of the one or more first columns may include multiple start and length indicator values (SLIVs) for the multiple TBs, each of the one or more second rows may include a single SLIV for the single TB, and each of the one or more second columns may indicate a number of repetitions of the single TB. Also, downlink control information (DCI) or a medium access control (MAC) control element (MAC-CE) associated with the single TDRA table may include a single bit that indicates a switch from the first TB mode to the second TB mode or a switch from the second TB mode to the first TB mode.

Additionally, the at least one TDRA table for the plurality of TB modes may correspond to a first TDRA table for the first TB mode and a second TDRA table for the second TB mode. Also, downlink control information (DCI) or a medium access control (MAC) control element (MAC-CE) associated with the at least one TDRA table may include at least one bit that indicates the first TDRA table or the second TDRA table. One or more rows and one or more columns in the first TDRA table may be associated with a structure of the first TB mode, and one or more rows and one or more columns in the second TDRA table may be associated with a structure of the second TB mode.

At 1206, the base station may transmit downlink data to the UE, or receive uplink data from the UE, based on the one of the plurality of TB modes, as described in connection with the examples in FIGS. 4-8B. For example, base station 904 may transmit downlink data to the UE, or receive uplink data from the UE, based on the one of the plurality of TB modes, as described in connection with 960 in FIG. 9. Further, 1206 may be performed by determination component 1540 in FIG. 15.

Figure 13:
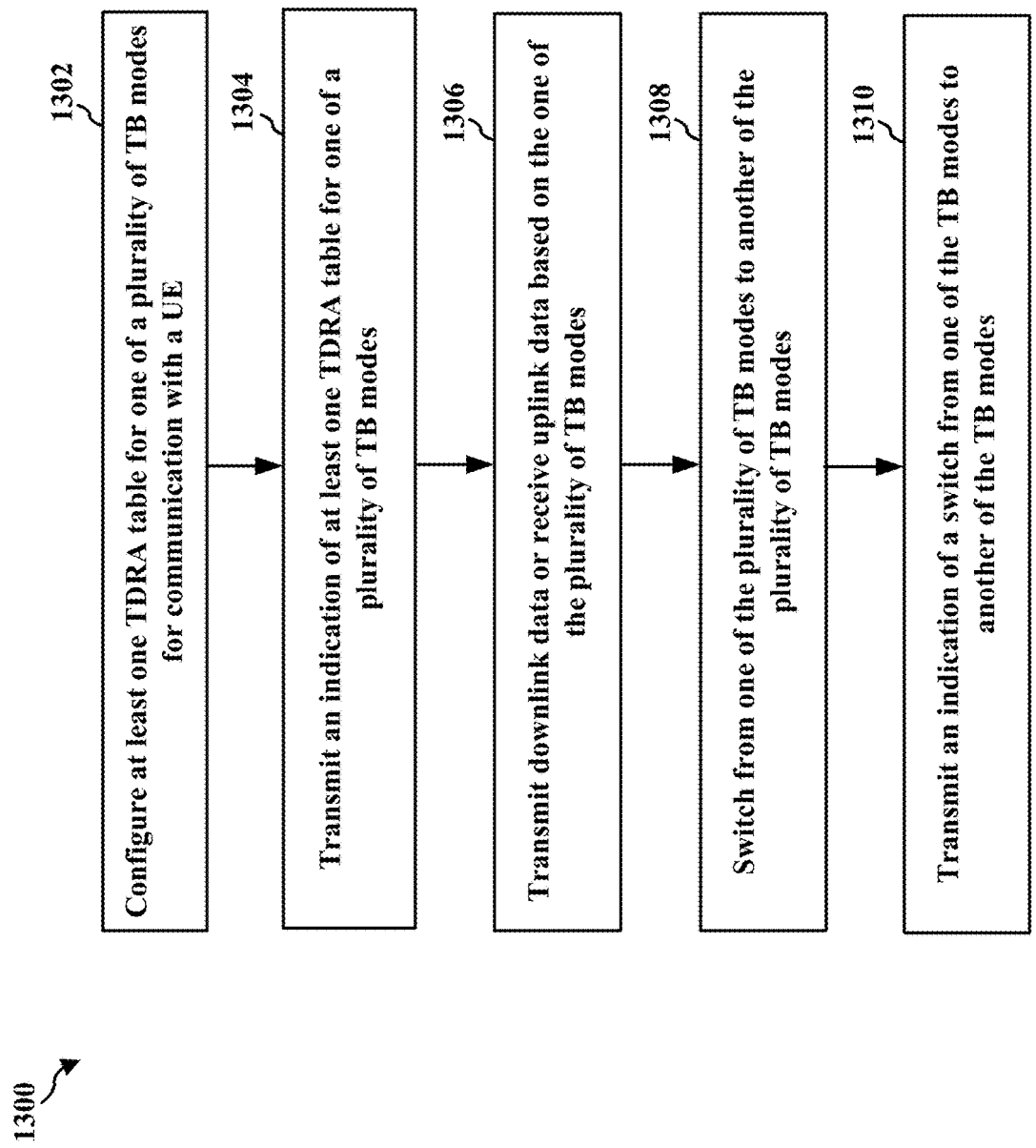
FIG. 13 is a flowchart of a method of wireless communication.

FIG. 13 is a flowchart 1300 of a method of wireless communication. The method may be performed by a base station or a component of a base station (e.g., the base station 102, 180, 310, 904; the apparatus 1502). The methods described herein may provide a number of benefits, such as improving communication signaling, resource utilization, and/or power savings.

At 1302, the base station may configure at least one TDRA table for a plurality of TB modes for communication with a UE, the plurality of TB modes including at least one of a first TB mode or a second TB mode, the first TB mode corresponding to multiple TBs via a single grant, the second TB mode corresponding to a single TB with at least one repetition via the single grant, as described in connection with the examples in FIGS. 4-8B. For example, base station 904 may configure at least one TDRA table for a plurality of TB modes for communication with a UE, the plurality of TB modes including at least one of a first TB mode or a second TB mode, the first TB mode corresponding to multiple TBs via a single grant, the second TB mode corresponding to a single TB with at least one repetition via the single grant, as described in connection with 910 in FIG. 9. Further, 1302 may be performed by determination component 1540 in FIG. 15.

At 1304, the base station may transmit, to the UE, an indication of the at least one TDRA table for one of the plurality of TB modes, as described in connection with the examples in FIGS. 4-8B. For example, base station 904 may transmit, to the UE, an indication of the at least one TDRA table for one of the plurality of TB modes, as described in connection with 920 in FIG. 9. Further, 1304 may be performed by determination component 1540 in FIG. 15. The indication of the at least one TDRA table may be transmitted via at least one of downlink control information (DCI), radio resource control (RRC) signaling, or a medium access control (MAC) control element (MAC-CE). In some instances, the first TB mode may correspond to the multiple TBs via a single downlink control information (DCI). Also, the second TB mode may correspond to the at least one repetition of the single TB via at least one allocation of the single grant.

In some aspects, the at least one TDRA table for the plurality of TB modes may correspond to a single TDRA table for the first TB mode and the second TB mode. A column or a flag in the single TDRA table may identify the first TB mode or the second TB mode. The column or the flag in the single TDRA table may be associated with a plurality of start and length indicator values (SLIVs), and a size of the single TB may be based on a first SLIV of the plurality of SLIVs or a shortest SLIV of the plurality of SLIVs in a same row of the single TDRA table. Also, a radio resource control (RRC) configuration may indicate one or more rows in the single TDRA table associated with the first TB mode and one or more rows in the single TDRA table associated with the second TB mode.

In some instances, one or more first rows and one or more first columns in the single TDRA table may be associated with a structure of the first TB mode, and one or more second rows and one or more second columns in the single TDRA table may be associated with a structure of the second TB mode. Each of the one or more first rows or each of the one or more first columns may include multiple start and length indicator values (SLIVs) for the multiple TBs, each of the one or more second rows may include a single SLIV for the single TB, and each of the one or more second columns may indicate a number of repetitions of the single TB. Also, downlink control information (DCI) or a medium access control (MAC) control element (MAC-CE) associated with the single TDRA table may include a single bit that indicates a switch from the first TB mode to the second TB mode or a switch from the second TB mode to the first TB mode.

Additionally, the at least one TDRA table for the plurality of TB modes may correspond to a first TDRA table for the first TB mode and a second TDRA table for the second TB mode. Also, downlink control information (DCI) or a medium access control (MAC) control element (MAC-CE) associated with the at least one TDRA table may include at least one bit that indicates the first TDRA table or the second TDRA table. One or more rows and one or more columns in the first TDRA table may be associated with a structure of the first TB mode, and one or more rows and one or more columns in the second TDRA table may be associated with a structure of the second TB mode.

At 1306, the base station may transmit downlink data to the UE, or receive uplink data from the UE, based on the one of the plurality of TB modes, as described in connection with the examples in FIGS. 4-8B. For example, base station 904 may transmit downlink data to the UE, or receive uplink data from the UE, based on the one of the plurality of TB modes, as described in connection with 960 in FIG. 9. Further, 1306 may be performed by determination component 1540 in FIG. 15.

At 1308, the base station may switch from the one of the plurality of TB modes to another of the plurality of TB modes, as described in connection with the examples in FIGS. 4-8B. For example, base station 904 may switch from the one of the plurality of TB modes to another of the plurality of TB modes, as described in connection with 970 in FIG. 9. Further, 1308 may be performed by determination component 1540 in FIG. 15.

At 1310, the base station may transmit, to the UE, an indication of the switch from the one of the plurality of TB modes to the another of the plurality of TB modes, as described in connection with the examples in FIGS. 4-8B. For example, base station 904 may transmit, to the UE, an indication of the switch from the one of the plurality of TB modes to the another of the plurality of TB modes, as described in connection with 980 in FIG. 9. Further, 1310 may be performed by determination component 1540 in FIG. 15.

Figure 14:
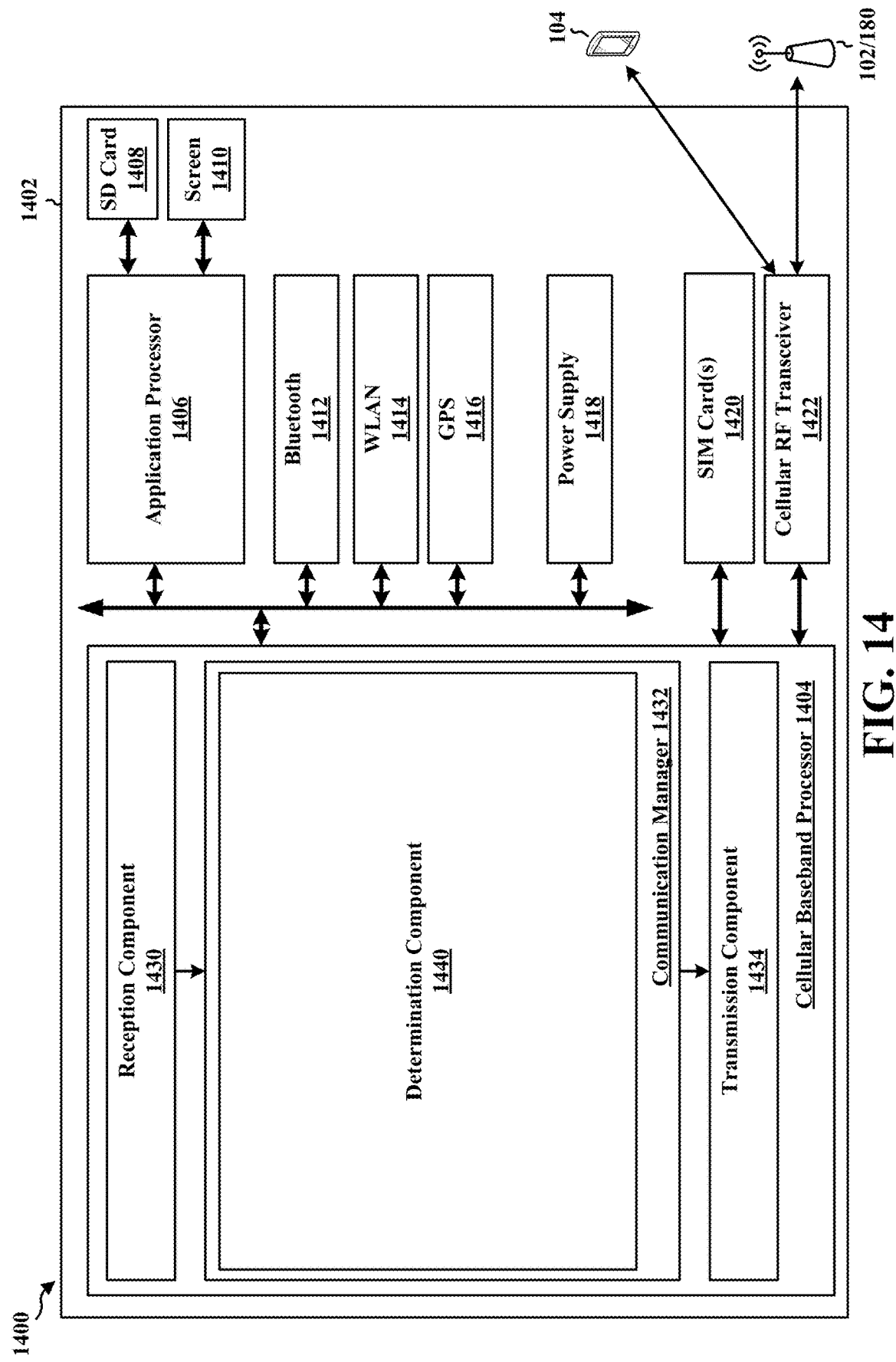
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a determination component 1440 that is configured to receive, from a base station, an indication of at least one time domain resource allocation (TDRA) table for one of a plurality of transport block (TB) modes for communication with the base station, the plurality of TB modes including at least one of a first TB mode or a second TB mode, the first TB mode corresponding to multiple TBs via a single grant, the second TB mode corresponding to a single TB with at least one repetition via the single grant, e.g., as described in connection with step 1102 above. Determination component 1440 may also be configured to apply, based on the at least one TDRA table, the one of the plurality of TB modes for the communication with the base station, e.g., as described in connection with step 1104 above. Determination component 1440 may also be configured to transmit uplink data to the base station, or receive downlink data from the base station, based on the one of the plurality of TB modes, e.g., as described in connection with step 1106 above. Determination component 1440 may also be configured to receive, from the base station, an indication of a switch from the one of the plurality of TB modes to another of the plurality of TB modes, e.g., as described in connection with step 1108 above.

The apparatus may include additional components that perform each of the blocks of the algorithm in the flowcharts of FIGS. 9, 10, and 11. As such, each block in the flowcharts of FIGS. 9, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving, from a base station, an indication of at least one time domain resource allocation (TDRA) table for one of a plurality of transport block (TB) modes for communication with the base station, the plurality of TB modes including at least one of a first TB mode or a second TB mode, the first TB mode corresponding to multiple TBs via a single grant, the second TB mode corresponding to a single TB with at least one repetition via the single grant; means for applying, based on the at least one TDRA table, the one of the plurality of TB modes for the communication with the base station; means for transmitting uplink data to the base station, or means for receiving downlink data from the base station, based on the one of the plurality of TB modes; and means for receiving, from the base station, an indication of a switch from the one of the plurality of TB modes to another of the plurality of TB modes. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
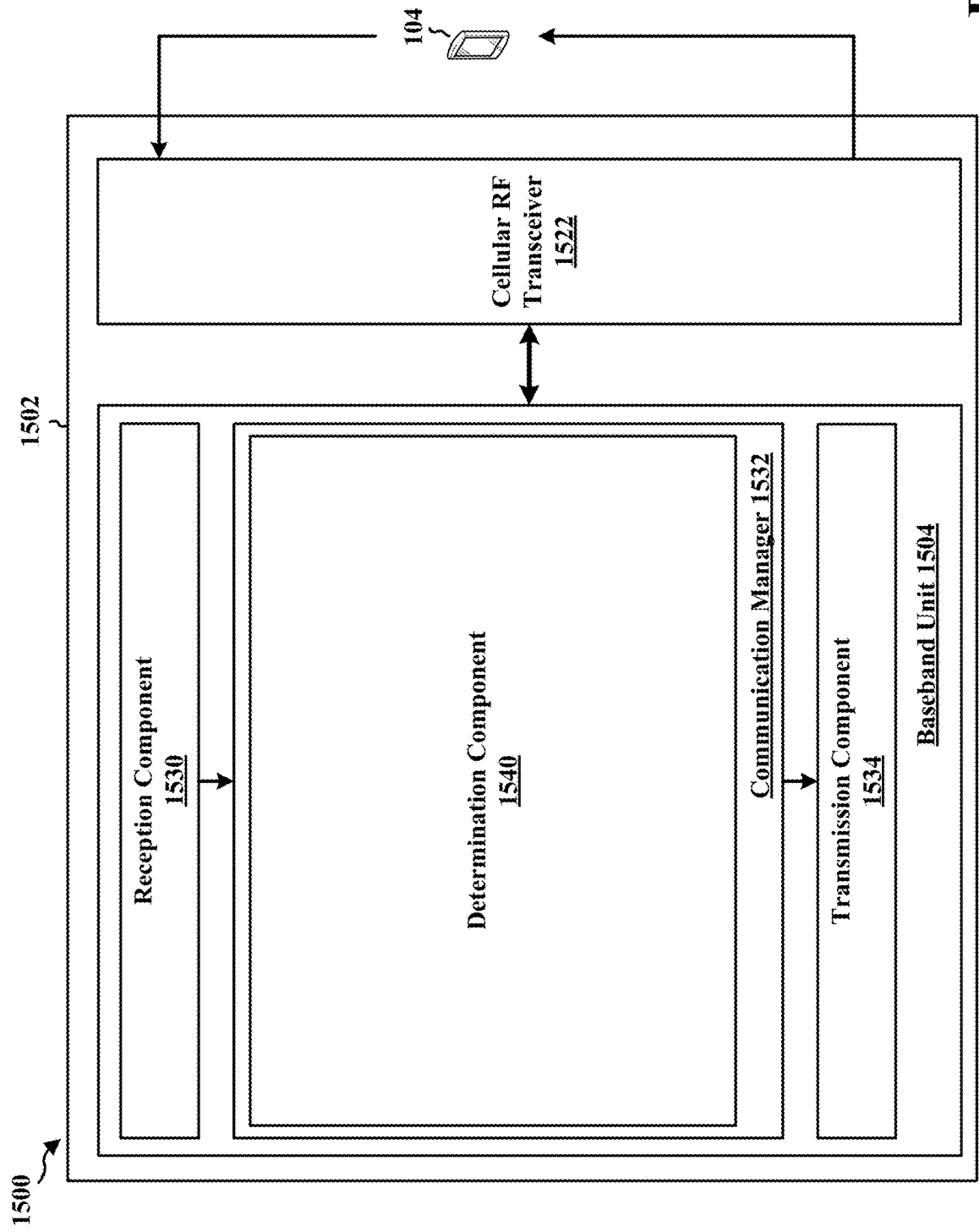
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a determination component 1540 that is configured to configure at least one time domain resource allocation (TDRA) table for a plurality of transport block (TB) modes for communication with a user equipment (UE), the plurality of TB modes including at least one of a first TB mode or a second TB mode, the first TB mode corresponding to multiple TBs via a single grant, the second TB mode corresponding to a single TB with at least one repetition via the single grant, e.g., as described in connection with step 1302 above. Determination component 1540 may also be configured to transmit, to the UE, an indication of the at least one TDRA table for one of the plurality of TB modes, e.g., as described in connection with step 1304 above. Determination component 1540 may also be configured to transmit downlink data to the UE, or receive uplink data from the UE, based on the one of the plurality of TB modes, e.g., as described in connection with step 1306 above. Determination component 1540 may also be configured to switch from the one of the plurality of TB modes to another of the plurality of TB modes, e.g., as described in connection with step 1308 above. Determination component 1540 may also be configured to transmit, to the UE, an indication of the switch from the one of the plurality of TB modes to the another of the plurality of TB modes, e.g., as described in connection with step 1310 above.

The apparatus may include additional components that perform each of the blocks of the algorithm in the flowcharts of FIGS. 9, 12, and 13. As such, each block in the flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for configuring at least one time domain resource allocation (TDRA) table for a plurality of transport block (TB) modes for communication with a user equipment (UE), the plurality of TB modes including at least one of a first TB mode or a second TB mode, the first TB mode corresponding to multiple TBs via a single grant, the second TB mode corresponding to a single TB with at least one repetition via the single grant; means for transmitting, to the UE, an indication of the at least one TDRA table for one of the plurality of TB modes; means for transmitting downlink data to the UE, or means for receiving uplink data from the UE, based on the one of the plurality of TB modes; means for switching from the one of the plurality of TB modes to another of the plurality of TB modes; and means for transmitting, to the UE, an indication of the switch from the one of the plurality of TB modes to the another of the plurality of TB modes. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: receive, from a base station, an indication of at least one time domain resource allocation (TDRA) table for one of a plurality of transport block (TB) modes for communication with the base station, the plurality of TB modes including at least one of a first TB mode or a second TB mode, the first TB mode corresponding to multiple TBs via a single grant, the second TB mode corresponding to a single TB with at least one repetition via the single grant; apply, based on the at least one TDRA table, the one of the plurality of TB modes for the communication with the base station; and transmit uplink data to the base station, or receive downlink data from the base station, based on the one of the plurality of TB modes.

Aspect 2 is the apparatus of aspect 1, where the first TB mode corresponds to the multiple TBs via a single downlink control information (DCI).

Aspect 3 is the apparatus of any of aspects 1 and 2, where the second TB mode corresponds to the at least one repetition of the single TB via at least one allocation of the single grant.

Aspect 4 is the apparatus of any of aspects 1 to 3, where the at least one TDRA table for the plurality of TB modes corresponds to a single TDRA table for the first TB mode and the second TB mode.

Aspect 5 is the apparatus of any of aspects 1 to 4, where a column or a flag in the single TDRA table identifies the first TB mode or the second TB mode.

Aspect 6 is the apparatus of any of aspects 1 to 5, where the column or the flag in the single TDRA table is associated with a plurality of start and length indicator values (SLIVs), and where a size of the single TB is based on a first SLIV of the plurality of SLIVs or a shortest SLIV of the plurality of SLIVs in a same row of the single TDRA table.

Aspect 7 is the apparatus of any of aspects 1 to 6, where a radio resource control (RRC) configuration indicates one or more rows in the single TDRA table associated with the first TB mode and one or more rows in the single TDRA table associated with the second TB mode.

Aspect 8 is the apparatus of any of aspects 1 to 7, where one or more first rows and one or more first columns in the single TDRA table are associated with a structure of the first TB mode, and one or more second rows and one or more second columns in the single TDRA table are associated with a structure of the second TB mode.

Aspect 9 is the apparatus of any of aspects 1 to 8, where each of the one or more first rows or each of the one or more first columns include multiple start and length indicator values (SLIVs) for the multiple TBs, each of the one or more second rows include a single SLIV for the single TB, and each of the one or more second columns indicate a number of repetitions of the single TB.

Aspect 10 is the apparatus of any of aspects 1 to 9, where downlink control information (DCI) or a medium access control (MAC) control element (MAC-CE) associated with the single TDRA table includes a single bit that indicates a switch from the first TB mode to the second TB mode or a switch from the second TB mode to the first TB mode.

Aspect 11 is the apparatus of any of aspects 1 to 10, where the at least one TDRA table for the plurality of TB modes corresponds to a first TDRA table for the first TB mode and a second TDRA table for the second TB mode.

Aspect 12 is the apparatus of any of aspects 1 to 11, where downlink control information (DCI) or a medium access control (MAC) control element (MAC-CE) associated with the at least one TDRA table includes at least one bit that indicates the first TDRA table or the second TDRA table.

Aspect 13 is the apparatus of any of aspects 1 to 12, where one or more rows and one or more columns in the first TDRA table are associated with a structure of the first TB mode, and one or more rows and one or more columns in the second TDRA table are associated with a structure of the second TB mode.

Aspect 14 is the apparatus of any of aspects 1 to 13, where the at least one processor is further configured to: receive, from the base station, an indication of a switch from the one of the plurality of TB modes to another of the plurality of TB modes.

Aspect 15 is the apparatus of any of aspects 1 to 14, where the indication of the at least one TDRA table is received via at least one of downlink control information (DCI), radio resource control (RRC) signaling, or a medium access control (MAC) control element (MAC-CE).

Aspect 16 is the apparatus of any of aspects 1 to 15, further including a transceiver coupled to the at least one processor.

Aspect 17 is a method of wireless communication for implementing any of aspects 1 to 16.

Aspect 18 is an apparatus for wireless communication including means for implementing any of aspects 1 to 16.

Aspect 19 is a computer-readable medium storing computer executable code, where the code when executed by a processor causes the processor to implement any of aspects 1 to 16.

Aspect 20 is an apparatus for wireless communication at a base station including at least one processor coupled to a memory and configured to: configure at least one time domain resource allocation (TDRA) table for a plurality of transport block (TB) modes for communication with a user equipment (UE), the plurality of TB modes including at least one of a first TB mode or a second TB mode, the first TB mode corresponding to multiple TBs via a single grant, the second TB mode corresponding to a single TB with at least one repetition via the single grant; transmit, to the UE, an indication of the at least one TDRA table for one of the plurality of TB modes; and transmit downlink data to the UE, or receive uplink data from the UE, based on the one of the plurality of TB modes.

Aspect 21 is the apparatus of aspect 20, where the first TB mode corresponds to the multiple TBs via a single downlink control information (DCI).

Aspect 22 is the apparatus of any of aspects 20 and 21, where the second TB mode corresponds to the at least one repetition of the single TB via at least one allocation of the single grant.

Aspect 23 is the apparatus of any of aspects 20 and 22, where the at least one TDRA table for the plurality of TB modes corresponds to a single TDRA table for the first TB mode and the second TB mode.

Aspect 24 is the apparatus of any of aspects 20 to 23, where a column or a flag in the single TDRA table identifies the first TB mode or the second TB mode, where the column or the flag in the single TDRA table is associated with a plurality of start and length indicator values (SLIVs), and where a size of the single TB is based on a first SLIV of the plurality of SLIVs or a shortest SLIV of the plurality of SLIVs in a same row of the single TDRA table.

Aspect 25 is the apparatus of any of aspects 20 to 24, where a radio resource control (RRC) configuration indicates one or more rows in the single TDRA table associated with the first TB mode and one or more rows in the single TDRA table associated with the second TB mode.

Aspect 26 is the apparatus of any of aspects 20 to 25, where one or more first rows and one or more first columns in the single TDRA table are associated with a structure of the first TB mode, and one or more second rows and one or more second columns in the single TDRA table are associated with a structure of the second TB mode, where each of the one or more first rows or each of the one or more first columns include multiple start and length indicator values (SLIVs) for the multiple TBs, each of the one or more second rows include a single SLIV for the single TB, and each of the one or more second columns indicate a number of repetitions of the single TB.

Aspect 27 is the apparatus of any of aspects 20 to 26, where downlink control information (DCI) or a medium access control (MAC) control element (MAC-CE) associated with the single TDRA table includes a single bit that indicates a switch from the first TB mode to the second TB mode or a switch from the second TB mode to the first TB mode.

Aspect 28 is the apparatus of any of aspects 20 to 27, where the at least one TDRA table for the plurality of TB modes corresponds to a first TDRA table for the first TB mode and a second TDRA table for the second TB mode.

Aspect 29 is the apparatus of any of aspects 20 to 28, where downlink control information (DCI) or a medium access control (MAC) control element (MAC-CE) associated with the at least one TDRA table includes at least one bit that indicates the first TDRA table or the second TDRA table.

Aspect 30 is the apparatus of any of aspects 20 to 29, where one or more rows and one or more columns in the first TDRA table are associated with a structure of the first TB mode, and one or more rows and one or more columns in the second TDRA table are associated with a structure of the second TB mode.

Aspect 31 is the apparatus of any of aspects 20 to 30, where the at least one processor is further configured to: switch from the one of the plurality of TB modes to another of the plurality of TB modes; and transmit, to the UE, an indication of the switch from the one of the plurality of TB modes to the another of the plurality of TB modes.

Aspect 32 is the apparatus of any of aspects 20 to 31, where the indication of the at least one TDRA table is transmitted via at least one of downlink control information (DCI), radio resource control (RRC) signaling, or a medium access control (MAC) control element (MAC-CE).

Aspect 33 is the apparatus of any of aspects 20 to 32, further including a transceiver coupled to the at least one processor.

Aspect 34 is a method of wireless communication for implementing any of aspects 20 to 33.

Aspect 35 is an apparatus for wireless communication including means for implementing any of aspects 20 to 33.

Aspect 36 is a computer-readable medium storing computer executable code, where the code when executed by a processor causes the processor to implement any of aspects 20 to 33.

What is claimed is:

1. An apparatus for wireless communication at a user equipment (UE), comprising:
   a memory; and
   at least one processor coupled to the memory and configured to:
      receive, from a base station, an indication of at least one time domain resource allocation (TDRA) table for one of a plurality of transport block (TB) modes for communication with the base station, the plurality of TB modes including at least one of a first TB mode or a second TB mode, the first TB mode corresponding to multiple TBs via a single grant, the second TB mode corresponding to a single TB with at least one repetition via the single grant;
      apply, based on the at least one TDRA table, the one of the plurality of TB modes for the communication with the base station; and
      transmit uplink data to the base station, or receive downlink data from the base station, based on the one of the plurality of TB modes.

2. The apparatus of claim 1, wherein the first TB mode corresponds to the multiple TBs via a single downlink control information (DCI).

3. The apparatus of claim 1, wherein the second TB mode corresponds to the at least one repetition of the single TB via at least one allocation of the single grant.

4. The apparatus of claim 1, wherein the at least one TDRA table for the plurality of TB modes corresponds to a single TDRA table for the first TB mode and the second TB mode.

5. The apparatus of claim 4, wherein a column or a flag in the single TDRA table identifies the first TB mode or the second TB mode.

6. The apparatus of claim 5, wherein the column or the flag in the single TDRA table is associated with a plurality of start and length indicator values (SLIVs), and wherein a size of the single TB is based on a first SLIV of the plurality of SLIVs or a shortest SLIV of the plurality of SLIVs in a same row of the single TDRA table.

7. The apparatus of claim 4, wherein a radio resource control (RRC) configuration indicates one or more rows in the single TDRA table associated with the first TB mode and one or more rows in the single TDRA table associated with the second TB mode.

8. The apparatus of claim 4, wherein one or more first rows and one or more first columns in the single TDRA table are associated with a structure of the first TB mode, and one or more second rows and one or more second columns in the single TDRA table are associated with a structure of the second TB mode.

9. The apparatus of claim 8, wherein each of the one or more first rows or each of the one or more first columns include multiple start and length indicator values (SLIVs) for the multiple TBs, each of the one or more second rows include a single SLIV for the single TB, and each of the one or more second columns indicate a number of repetitions of the single TB.

10. The apparatus of claim 4, wherein downlink control information (DCI) or a medium access control (MAC) control element (MAC-CE) associated with the single TDRA table includes a single bit that indicates a switch from the first TB mode to the second TB mode or a switch from the second TB mode to the first TB mode.

11. The apparatus of claim 1, wherein the at least one TDRA table for the plurality of TB modes corresponds to a first TDRA table for the first TB mode and a second TDRA table for the second TB mode.

12. The apparatus of claim 11, wherein downlink control information (DCI) or a medium access control (MAC) control element (MAC-CE) associated with the at least one TDRA table includes at least one bit that indicates the first TDRA table or the second TDRA table.

13. The apparatus of claim 11, wherein one or more rows and one or more columns in the first TDRA table are associated with a structure of the first TB mode, and one or more rows and one or more columns in the second TDRA table are associated with a structure of the second TB mode.

14. The apparatus of claim 1, wherein the at least one processor is further configured to:
   receive, from the base station, an indication of a switch from the one of the plurality of TB modes to another of the plurality of TB modes.

15. The apparatus of claim 1, further comprising a transceiver coupled to the at least one processor;
   wherein the indication of the at least one TDRA table is received via at least one of downlink control information (DCI), radio resource control (RRC) signaling, or a medium access control (MAC) control element (MAC-CE).

16. A method of wireless communication at a user equipment (UE), comprising:
   receiving, from a base station, an indication of at least one time domain resource allocation (TDRA) table for one of a plurality of transport block (TB) modes for communication with the base station, the plurality of TB modes including at least one of a first TB mode or a second TB mode, the first TB mode corresponding to multiple TBs via a single grant, the second TB mode corresponding to a single TB with at least one repetition via the single grant;
   applying, based on the at least one TDRA table, the one of the plurality of TB modes for the communication with the base station; and
   transmitting uplink data to the base station, or receiving downlink data from the base station, based on the one of the plurality of TB modes.

17. An apparatus for wireless communication at a base station, comprising:
   a memory; and
   at least one processor coupled to the memory and configured to:

configure at least one time domain resource allocation (TDRA) table for a plurality of transport block (TB) modes for communication with a user equipment (UE), the plurality of TB modes including at least one of a first TB mode or a second TB mode, the first TB mode corresponding to multiple TBs via a single grant, the second TB mode corresponding to a single TB with at least one repetition via the single grant;

transmit, to the UE, an indication of the at least one TDRA table for one of the plurality of TB modes; and transmit downlink data to the UE, or receive uplink data from the UE, based on the one of the plurality of TB modes.

18. The apparatus of claim 17, wherein the first TB mode corresponds to the multiple TBs via a single downlink control information (DCI).

19. The apparatus of claim 17, wherein the second TB mode corresponds to the at least one repetition of the single TB via at least one allocation of the single grant.

20. The apparatus of claim 17, wherein the at least one TDRA table for the plurality of TB modes corresponds to a single TDRA table for the first TB mode and the second TB mode.

21. The apparatus of claim 20, wherein a column or a flag in the single TDRA table identifies the first TB mode or the second TB mode,
wherein the column or the flag in the single TDRA table is associated with a plurality of start and length indicator values (SLIVs), and wherein a size of the single TB is based on a first SLIV of the plurality of SLIVs or a shortest SLIV of the plurality of SLIVs in a same row of the single TDRA table.

22. The apparatus of claim 20, wherein a radio resource control (RRC) configuration indicates one or more rows in the single TDRA table associated with the first TB mode and one or more rows in the single TDRA table associated with the second TB mode.

23. The apparatus of claim 20, wherein one or more first rows and one or more first columns in the single TDRA table are associated with a structure of the first TB mode, and one or more second rows and one or more second columns in the single TDRA table are associated with a structure of the second TB mode,
wherein each of the one or more first rows or each of the one or more first columns include multiple start and length indicator values (SLIVs) for the multiple TBs, each of the one or more second rows include a single SLIV for the single TB, and each of the one or more second columns indicate a number of repetitions of the single TB.

24. The apparatus of claim 20, wherein downlink control information (DCI) or a medium access control (MAC) control element (MAC-CE) associated with the single TDRA table includes a single bit that indicates a switch from the first TB mode to the second TB mode or a switch from the second TB mode to the first TB mode.

25. The apparatus of claim 17, wherein the at least one TDRA table for the plurality of TB modes corresponds to a first TDRA table for the first TB mode and a second TDRA table for the second TB mode.

26. The apparatus of claim 25, wherein downlink control information (DCI) or a medium access control (MAC) control element (MAC-CE) associated with the at least one TDRA table includes at least one bit that indicates the first TDRA table or the second TDRA table.

27. The apparatus of claim 25, wherein one or more rows and one or more columns in the first TDRA table are associated with a structure of the first TB mode, and one or more rows and one or more columns in the second TDRA table are associated with a structure of the second TB mode.

28. The apparatus of claim 17, wherein the at least one processor is further configured to:
switch from the one of the plurality of TB modes to another of the plurality of TB modes; and
transmit, to the UE, an indication of the switch from the one of the plurality of TB modes to the another of the plurality of TB modes.

29. The apparatus of claim 17, further comprising a transceiver coupled to the at least one processor;
wherein the indication of the at least one TDRA table is transmitted via at least one of downlink control information (DCI), radio resource control (RRC) signaling, or a medium access control (MAC) control element (MAC-CE).

30. A method of wireless communication at a base station, comprising:
configuring at least one time domain resource allocation (TDRA) table for a plurality of transport block (TB) modes for communication with a user equipment (UE), the plurality of TB modes including at least one of a first TB mode or a second TB mode, the first TB mode corresponding to multiple TBs via a single grant, the second TB mode corresponding to a single TB with at least one repetition via the single grant;
transmitting, to the UE, an indication of the at least one TDRA table for one of the plurality of TB modes; and
transmitting downlink data to the UE, or receiving uplink data from the UE, based on the one of the plurality of TB modes.

* * * * *